(12) United States Patent
Smith

(10) Patent No.: US 9,598,857 B2
(45) Date of Patent: Mar. 21, 2017

(54) THERMAL INSULATION PRODUCTS FOR INSULATING BUILDINGS AND OTHER ENCLOSED ENVIRONMENTS

(71) Applicant: Nanopore, Inc., Albuquerque, NM (US)

(72) Inventor: Douglas M. Smith, Albuquerque, NM (US)

(73) Assignee: Nanopore, Inc., Albuquerque, NM (US)

( * ) Notice: Subject to any disclaimer, the term of this patent is extended or adjusted under 35 U.S.C. 154(b) by 48 days.

(21) Appl. No.: 14/154,806

(22) Filed: Jan. 14, 2014

(65) Prior Publication Data

US 2014/0366480 A1    Dec. 18, 2014

Related U.S. Application Data

(63) Continuation-in-part of application No. 13/741,194, filed on Jan. 14, 2013.

(Continued)

(51) Int. Cl.
*E04B 1/80*    (2006.01)
*F16L 59/065*    (2006.01)
(Continued)

(52) U.S. Cl.
CPC .............. *E04B 1/803* (2013.01); *E04B 1/806* (2013.01); *F16L 59/065* (2013.01);
(Continued)

(58) Field of Classification Search
CPC ...... E04B 1/7608; E04B 1/7654; E04B 1/806; E04B 1/803; E04B 2001/742; F16L 59/141
See application file for complete search history.

(56) References Cited

U.S. PATENT DOCUMENTS 3,357,585 A    12/1967   Morrison
3,812,886 A *   5/1974   Hallwood ............... F16L 59/06
                                                       138/149

(Continued)

FOREIGN PATENT DOCUMENTS

GB            865391           7/1957
GB            865391 A  *      4/1961   .............. E04B 1/80
JP         2008144929           6/2008

OTHER PUBLICATIONS

Jerkins, Porter J. et al., "Self-Evacuated MultiLayer Insulation of Lightweight Prefabricated Panels for Cryogenic Storage Tanks", NASA Technical Note, 1967, 27 pages.

(Continued)

*Primary Examiner* — Christine T Cajilig
(74) *Attorney, Agent, or Firm* — Marsh Fischmann & Breyfogle LLP

(57) ABSTRACT

High-efficiency thermal insulation products and methods for use thereof for use in insulating buildings, residential homes, and other enclosed environments. In one arrangement, a thermal insulation product includes a substantially gas-impermeable envelope having first and second opposing surfaces and a sealed interior portion between the first and second opposing surfaces, a support material within the sealed interior portion of the gas-impermeable envelope, and at least about 2 grams of a liquid per liter of a total volume of the sealed interior portion within the sealed interior portion. At least a portion of the liquid is operable to cyclically evaporate from adjacent one of the first and second opposing surfaces and subsequently condense adjacent the other of the first and second opposing surfaces depending on temperature differences between the first and second opposing surfaces.

54 Claims, 11 Drawing Sheets

Related U.S. Application Data

(60) Provisional application No. 61/799,590, filed on Mar. 15, 2013, provisional application No. 61/799,752, filed on Mar. 15, 2013, provisional application No. 61/799,173, filed on Mar. 15, 2013.

(51) Int. Cl.
  *F16L 59/14* (2006.01)
  *E04B 1/74* (2006.01)
  *E04B 1/76* (2006.01)

(52) U.S. Cl.
  CPC ....... *F16L 59/141* (2013.01); *E04B 2001/742* (2013.01); *E04B 2001/7691* (2013.01); *Y02B 80/12* (2013.01)

(56) References Cited

U.S. PATENT DOCUMENTS

| | | | |
|---|---|---|---|
| 4,303,432 A | 12/1981 | Torobin | |
| 4,420,922 A * | 12/1983 | Wilson | E04B 1/803 52/788.1 |
| 4,471,592 A * | 9/1984 | MacKinnon, Jr. | E04B 1/7608 52/361 |
| 4,606,196 A | 8/1986 | Acharya et al. | |
| 4,726,974 A | 2/1988 | Nowobilski et al. | |
| 5,010,762 A | 4/1991 | Logothetis et al. | |
| 5,076,984 A | 12/1991 | Bisplinghoff et al. | |
| 5,091,233 A | 2/1992 | Kirby et al. | |
| 5,175,975 A * | 1/1993 | Benson | A47J 27/002 428/172 |
| 5,331,789 A | 7/1994 | Cur et al. | |
| 5,376,424 A | 12/1994 | Watanabe | |
| 5,399,397 A | 3/1995 | Kollie et al. | |
| 5,478,867 A | 12/1995 | Tabor | |
| 5,505,810 A | 4/1996 | Kirby et al. | |
| 5,508,106 A | 4/1996 | Yoshino | |
| 5,543,194 A | 8/1996 | Rudy | |
| 5,575,871 A | 11/1996 | Ryoshi et al. | |
| 5,843,353 A | 12/1998 | De Vos et al. | |
| 6,153,135 A * | 11/2000 | Novitsky | B29C 44/3403 264/102 |
| 6,221,456 B1 | 4/2001 | Pogorski et al. | |
| 6,645,598 B2 * | 11/2003 | Alderman | B29C 65/18 126/618 |
| 6,967,051 B1 | 11/2005 | Augustynowicz et al. | |
| 8,156,703 B2 * | 4/2012 | Alderman | B32B 3/08 52/309.13 |
| 9,133,973 B2 | 9/2015 | Smith | |
| 2002/0147242 A1 | 10/2002 | Salyer et al. | |
| 2003/0014982 A1 | 1/2003 | Smith et al. | |
| 2003/0049433 A1 | 3/2003 | Virkler | |
| 2003/0143387 A1 | 7/2003 | Koizumi et al. | |
| 2008/0295434 A1 * | 12/2008 | Bills | E04B 1/7654 52/506.01 |
| 2009/0011171 A1 * | 1/2009 | Alderman | C08K 3/0008 428/72 |
| 2009/0031659 A1 | 2/2009 | Kalfon | |
| 2010/0078439 A1 | 4/2010 | Janssen et al. | |
| 2010/0282448 A1 | 11/2010 | Singh et al. | |
| 2010/0294467 A1 | 11/2010 | Varanasi et al. | |
| 2010/0305918 A1 | 12/2010 | Udell | |
| 2011/0129398 A1 * | 6/2011 | Markowz | B01J 20/041 423/230 |
| 2011/0167863 A1 | 7/2011 | Herrbold | |
| 2012/0156455 A1 * | 6/2012 | Kralj | E04B 1/806 428/213 |
| 2012/0286189 A1 | 11/2012 | Barthel et al. | |
| 2013/0216854 A1 | 8/2013 | Feinerman et al. | |
| 2013/0256318 A1 | 10/2013 | Kuehl et al. | |
| 2014/0196305 A1 | 7/2014 | Smith | |
| 2014/0291448 A1 | 10/2014 | Luck | |
| 2014/0360044 A1 | 12/2014 | Smith | |
| 2014/0367033 A1 | 12/2014 | Smith | |
| 2015/0159800 A1 | 6/2015 | Kimura et al. | |
| 2016/0003403 A1 | 1/2016 | Smith | |

OTHER PUBLICATIONS

Perkins, Porter J. et al., "Self-Evacuated MultiLayer Insulation of Lightweight Prefabricated Panels for Cryogenic Storage Tanks", NASA Technical Note, 1967, 27 pages.
Non-Final Office Action mailed Jan. 15, 2016 in related U.S Appl. No. 13/741,194.
Reply to Office Action tiled Jul. 15, 2016 in related U.S. Appl. No. 13/741,194.
Non-Final Office Action and Interview Summary mailed Nov. 18, 2016 in related U.S. Appl. No. 13/741,194.
Non-Final Office Action mailed Apr. 8, 2016 in related U.S. Appl. No. 14/154,704.
Reply to Office Action filed Oct. 11, 2016 in related U.S. Appl. No. 14/154,704.
Non-Final Office Action mailed Oct. 18, 2016 in related U.S. Appl. No. 14/826,916.
Notice of Allowance and Fee(s) Due mailed May 12, 2015 in related U.S. Appl. No. 14/154,760.
International Search Report and Written Opinion dated May 28, 2014 in related PCT Application No. PCT/ JS2014/01151T.
International Preliminary Report on Patentability dated Jul. 14, 2015 in related PCT Application No. PCT/ JS2014/01151T.

* cited by examiner

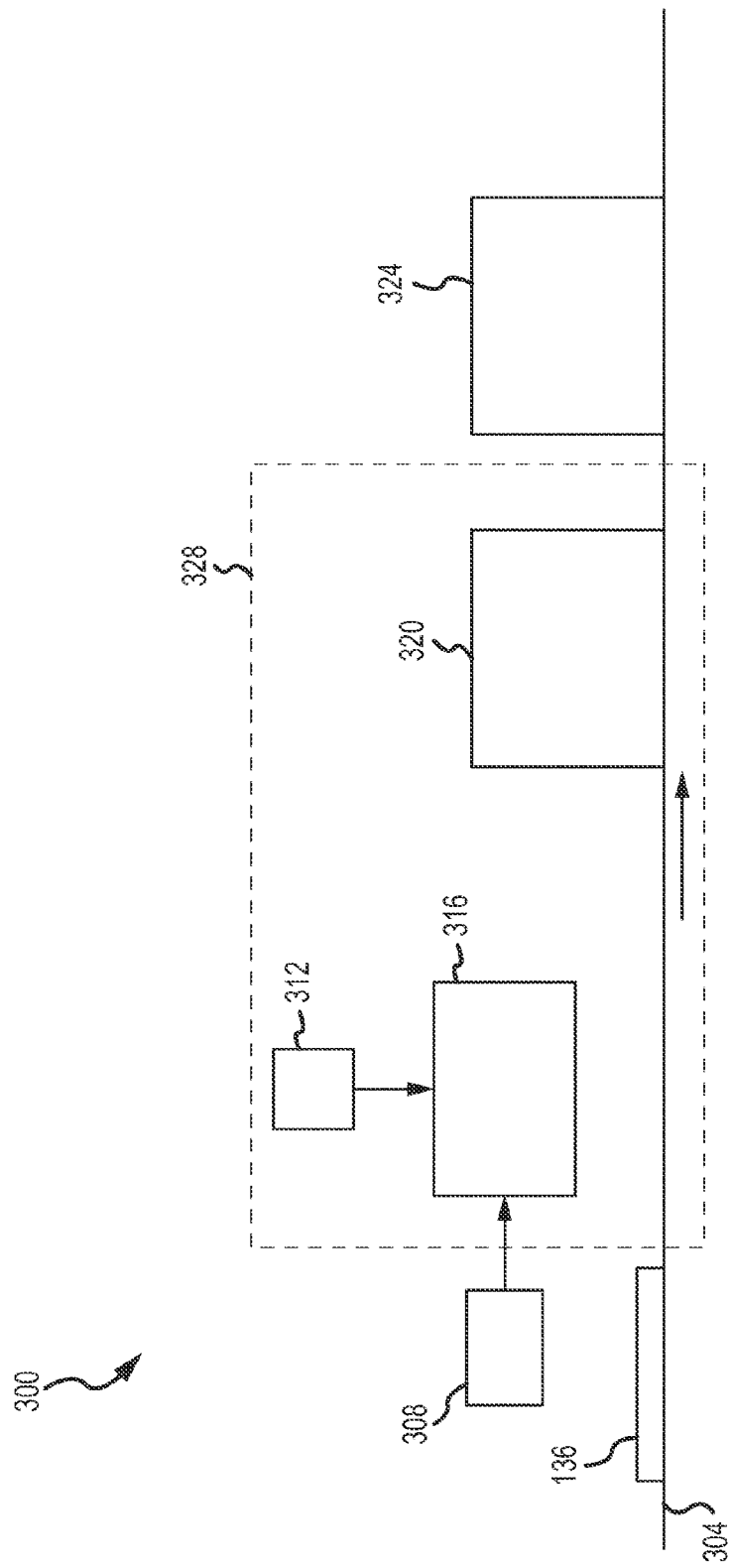

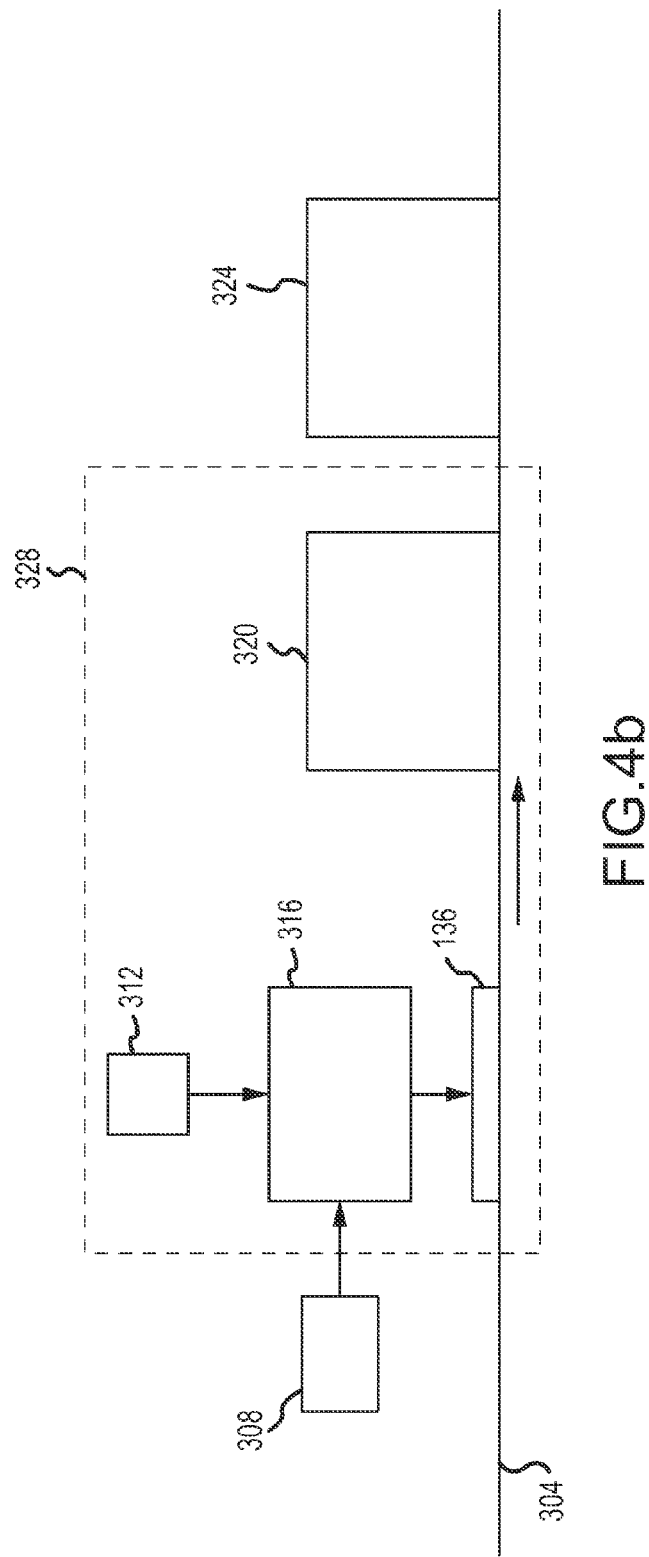

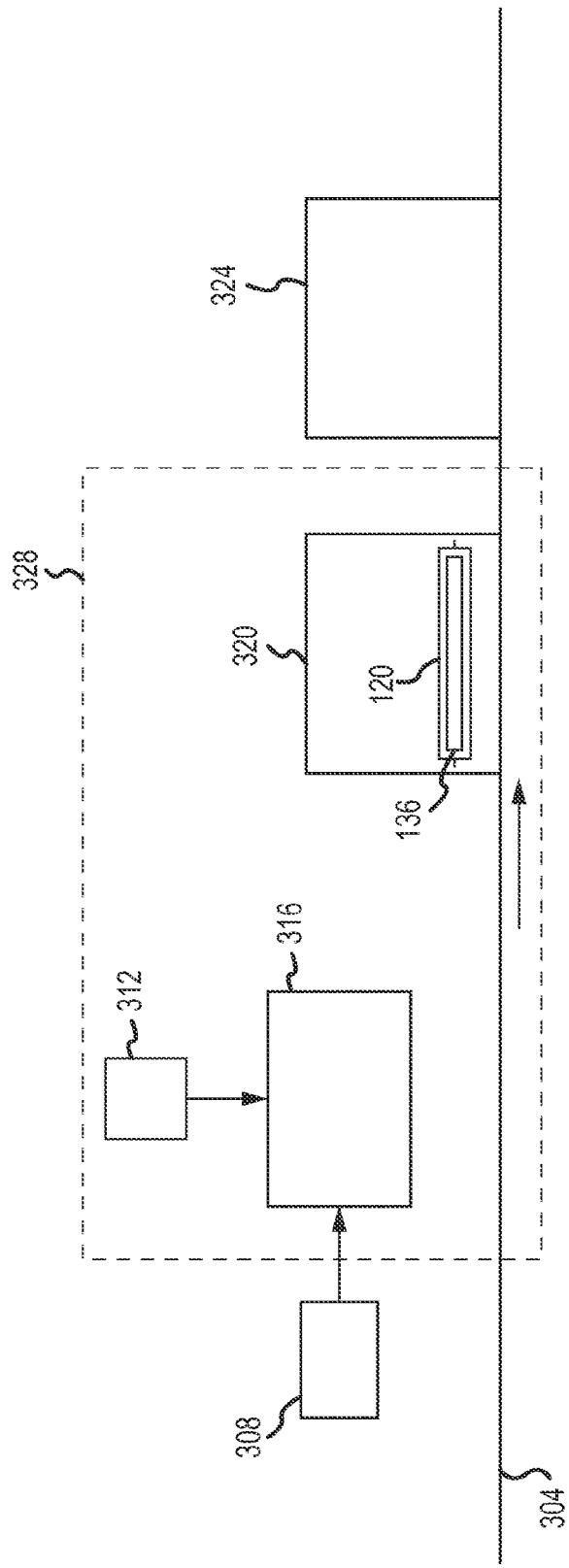

THERMAL INSULATION PRODUCTS FOR INSULATING BUILDINGS AND OTHER ENCLOSED ENVIRONMENTS

CROSS-REFERENCE TO RELATED APPLICATIONS

This application is a continuation-in-part of U.S. Ser. No. 13/741,194, entitled "Production of Thermal Insulation Products," and filed on Jan. 14, 2013. This application also claims priority from U.S. Ser. No. 61/799,590, entitled "Thermal Insulation Products for Insulating Buildings and Other Enclosed Environments," filed on Mar. 15, 2013; U.S. Ser. No. 61/799,752, entitled "Thermal Insulation Products and Production of Thermal Insulation Products," filed on Mar. 15, 2013; and U.S. Ser. No. 61/799,173, entitled "Thermal Insulation Products for Use with Non-Planar Objects," filed on Mar. 15, 2013. All the contents of the aforementioned applications are incorporated herein in their entirety as if set forth in full.

This application incorporates by reference the following non-provisional patent applications which are concurrently filed on Jan. 14, 2014 with the present application: U.S. Non-Provisional Patent Application No. 14/154,704 entitled "Thermal Insulation Products and Production of Thermal Insulation Products," inventor Douglas M. Smith,; and U.S. Non-Provisional Patent Application No. 14/154,760 entitled "Thermal Insulation Products for Use with Non-Planar Objects," inventor Douglas M. Smith. All the contents of the aforementioned applications are incorporated herein in their entirety as if set forth in full.

BACKGROUND

1. Field of the Invention

The present invention generally relates to high-efficiency insulation products (e.g., panels) and, more particularly, to high-efficiency insulation products that may be used insulate buildings and other enclosed environments.

2. Relevant Background

Thermal insulation generally refers to a porous material with an inherently low thermal conductivity serving to protect a system of interest such as an enclosed environment from heat flow into or out of the enclosed environment. The use of thermal insulation is prevalent in society ranging from use in domestic refrigerators (e.g., for reduced energy consumption or additional internal volume), in shipping containers containing ice or dry ice used for drugs or food (e.g., to extend the lifetime of the shipment), in the tiles on the space shuttle (e.g., used to protect the shuttle from the heat of reentry into the atmosphere), and/or the like. Most thermal insulation products used today are either fibrous materials, such as fiberglass, mineral wool and asbestos, or polymer foams, such as expanded polystyrene, polyurethane, foamed polyethylene and foamed polypropylene.

However, the use of fibrous materials may be undesirable in many instances due to problems related to health and safety. Furthermore, the use of polymer foams may be undesirable due to their flammability, lack of recyclability and release of environmentally unfriendly gases, such as fluorocarbons or hydrocarbons during manufacture. In addition, the thermal performance of both fibrous materials and polymer foam materials are on the same order as or greater than stagnant air (e.g., about 0.026 W/mK at ambient temperature). Because of increased concern with respect to energy efficiency and the environment, there has been much interest in the development of new classes of thermal insulation that have a thermal conductivity much less than that of air, such as aerogels, inert gas-filled panels and vacuum insulation panels.

For thermal insulation, one key measure of performance is the thermal conductivity of the material. More specifically, lower thermal conductivity means lower heat flow through the insulation for a given temperature difference. In the absence of convection, heat transfer through insulation occurs due to the sum of three components: solid phase conduction, gas phase conduction and radiation. Solid phase conduction may be minimized by using a low density material (e.g., a material comprising a high volume fraction of pores). Most insulation is between, for instance, 80 and 98% porous. It is also advantageous to use a solid material that has a low inherent thermal conductivity (e.g., plastics and some ceramics/glasses are better than metals).

The relative importance of radiation depends upon the temperature range of interest and becomes a more prevalent component as the temperature is increased above ambient and/or the magnitude of the other heat transfer modes is minimized. Materials with high infrared (IR) extinction coefficients due to absorption (e.g., IR opacifiers such as carbon black, iron oxide, etc.) or scattering (e.g., titania) are often added to high performance insulation to limit radiative heat transfer.

With control of radiation, suppression of free convection, use of low thermal conductivity materials and a highly porous solid matrix, the thermal conductivity of the insulation approaches that of the gas contained within the pores of the insulation. There are a number of methods for lowering gas phase conduction in insulation. One method to do so is to trap gases in the pores that have lower thermal conductivity than that of air, such as argon, carbon dioxide, xenon and krypton. Depending upon the gas employed, the thermal conductivity of insulation filled with an inert gas can range from, for instance, 0.009 to 0.018 W/mK. However, the insulation must be packaged such that the filler gas does not leak from the pores and also so that atmospheric gases (e.g., nitrogen, oxygen) do not penetrate the insulation.

Another method for controlling or lowering gas phase conduction is to employ the Knudsen effect. Generally, gas phase conductivity within the insulation may be dramatically reduced when the mean free path of the gas approaches the pore size of the insulation. In fact, gas phase conductivity may approach zero (so that the total effective thermal conductivity is the sum of only radiation and solid phase conduction) when the mean free path of the gas is much larger than the pore size. For instance, the mean free paths of the components of air are approximately 60 nanometers at ambient temperature and pressure, while the pore/cell size of polymer foams and fibrous materials is typically greater than 10 microns.

There are at least two approaches that can employ the Knudsen effect to lower gas phase conduction. A first approach is to encapsulate the insulation within a barrier material and partially evacuate the gas in the insulation (e.g., use a vacuum pump to evacuate the insulative material). This increases the mean free path of the gas by lowering the gas density, which lowers gas phase conduction. Materials employing such gas evacuation techniques can achieve a thermal conductivity of less than 0.002 W/mK at ambient temperatures, which is an order of magnitude improvement over conventional insulation.

The advantages of utilizing a vacuum with an insulative material have been known for many years and are the basis of vacuum Dewars that are used with cryogenic liquids and for storing hot or cold beverages or other products. For example, U.S. Pat. No. 1,071,817 by Stanley discloses a vacuum bottle or Dewar, where a jar is sealed inside another jar with a deep vacuum maintained in the annular space with the two jars being joined at the jar mouth. Such an approach minimizes joining and thermal bridging problems, but most insulation applications require many different shapes that cannot be met by a Dewar.

Another approach is to use a material with very small pores and low density. One such class of materials is nanoporous silica, also known as silica aerogels, which generally have small pores (e.g., <100 nm), a low density, and exhibit a total thermal conductivity at ambient pressure that is lower than that of the gas contained within the pores. It is known to use nanoporous silica in conjunction with a vacuum to create a vacuum insulation panel (VIP). U.S. Pat. No. 4,159,359 by Pelloux-Gervais discloses the use of compacted silica powders, such as precipitated, fumed, pyrogenic, or aerogels, contained in plastic barriers, which are subsequently evacuated and then sealed.

SUMMARY

Current manners of producing VIPs and the resulting VIPs are deficient in a number of regards that undermine their effectiveness, commercial viability, and the like. In one regard, the large number of processing steps involved in producing current VIPs leads to high processing and overhead costs and thus reductions in their commercial viability and the like. For instance, the need to manually/mechanically evacuate gases from the interior of the current VIPs during sealing of the outer barrier necessitates expensive vacuum equipment as well as production processes that are labor, energy and maintenance intensive.

As another example, it has been generally understood that the nanoporous core of current VIPs needs to be sufficiently dried (e.g., down to about 0.5 vol. %) before evacuation. However, doing so is far from a trivial process for a nanoporous, hygroscopic material that can be up to about one inch thick when trying to do so in only a few minutes of residence time. Complicating the drying process is the fact that the incoming core material (e.g., nanoporous silica), while being relatively dry just after leaving the supplier, can adsorb additional water from the air as it is conveyed to the VIP manufacturer. Also, any adsorbed water does not start leaving the core during evacuation until under about 20 mbar (e.g., due to its low vapor pressure at room temperature and because of its high heat of vaporization) which can lead to dramatic final pressure changes.

As a further example, large amounts of cutting scrap must often be recycled as standard starting size boards are produced which reduces plant throughput and increases quality control issues as the percent of scrap recycle varies with product mix (e.g., panel density, water content, and evacuation shrinkage all change with % recycle). Also, the thermal conductivity of the outer barrier films of current VIPs can be many (e.g., thousands of) times higher than that of the core leading to a decrease in effective thermal performance. In another regard, due to shrinkage of the VIP during evacuation, dimensional stability is difficult to maintain using current manufacturing processes. Thus, current VIPs often have dimensional variability of +/−3 mm in x-y dimensions possibly leading to significant gaps when assembled together (e.g., edge to edge) from a thermal viewpoint. In a further regard, the ability of the barrier films (e.g., metal foils, metalized plastics, plastics) of current VIPs to maintain a desired low pressure within the core over the long term is relatively unknown. Generally, barrier film permeation measured on virgin films is orders of magnitude better than for stressed films.

Still further, the relatively low volume of liquids in current VIPs (e.g., about 0.5 vol. % or less) limits the degree to which any phase changing of the liquids within the VIPs occurring due to temperature difference between the opposing first and second surfaces of the VIPs can improve transient performance of the VIPs (e.g., the time it takes for the temperatures adjacent the opposing surfaces to equilibrate. In the case of building insulation, for instance, the surface of a VIP facing an outside ambient environment may experience temperature swings (e.g., fluctuations) relative to the opposing surface of the VIP facing the interior of the building. For example, the outside ambient environment may be warmer than the interior of the building during the day but cold than the interior of the building during the night. These temperature differences may cause any liquids present within the VIPs to evaporate from the relatively warmer side and condense adjacent the relatively colder side. Liquid evaporating from the relatively warmer side may impart a cooling effect adjacent the relatively warmer side thus improving the transient performance of the VIPs. However, because current VIPs are designed and manufactured with an effort to minimize the volume of liquids therewithin, any improvement on transient performance due to the aforementioned phase changing effects is minimal at best.

In view of the foregoing, the present invention is directed to high-efficiency insulation products (e.g., panels) and systems, methods of manufacture thereof, methods of use thereof, etc., for buildings and other enclosed environments surrounded by ambient environments (e.g., outside ambient environments) that experience temperature swings relative to the temperature inside of the building or enclosed environment. In one aspect, a thermal insulation product for insulating an enclosed environment from temperature swings of an outside ambient environment includes a substantially gas-impermeable envelope comprising first and second opposing surfaces and a sealed interior portion between the first and second opposing surfaces; a support material within the sealed interior portion of the gas-impermeable envelope; and at least about 1 grams of a liquid per liter of a total volume of the sealed interior portion within the sealed interior portion, wherein at least a portion of the liquid is operable to cyclically evaporate from adjacent one of the first and second opposing surfaces and subsequently condense adjacent the other of the first and second opposing surfaces depending on a temperature difference between the first and second opposing surfaces.

In another aspect, a method of insulating a building includes positioning a plurality of thermal insulation panels relative to a frame of a building; where each thermal insulation panel comprises a substantially gas-impermeable envelope including first and second opposing surfaces and a sealed interior portion between the first and second opposing surfaces, a support material within the sealed interior portion of the gas-impermeable envelope, and at least about 1 grams of a liquid per liter of a total volume of the sealed interior portion disposed within the sealed interior portion; where the positioning includes orienting the plurality of thermal insulation panels so that the first opposing surface faces an interior of the building and the second opposing surface faces an outside ambient environment; where at least a portion of the liquid is operable to evaporate from adjacent the first opposing surface and subsequently condense adjacent the second opposing surface when a temperature of the interior of the building is greater than a temperature of the outside ambient environment; and where at least a portion of the liquid is operable to evaporate from adjacent the second opposing surface and subsequently condense adjacent the first opposing surface when a temperature of the interior of the building is less than a temperature of the outside ambient environment.

In another aspect, a building includes a plurality of interconnected wall structures; an interior portion inside of the plurality of interconnected wall structures; and a plurality of thermal insulation panels disposed within the plurality of interconnected wall structures; where each thermal insulation panel comprises a substantially gas-impermeable envelope including first opposing surface facing the interior portion of the building and a second opposing surface facing an outside ambient environment, a sealed interior portion between the first and second opposing surfaces, a support material within the sealed interior portion, and at least about 5 grams of a liquid per liter of a total volume of the sealed interior portion disposed within the sealed interior portion.

In another aspect, a method for making a thermal insulation product includes the steps of sealing a support material and a vapor within an interior portion of a substantially gas-impermeable envelope comprising first and second opposing surfaces; and condensing, at least a portion of the vapor to reduce the pressure within the gas-impermeable envelope, where the sealed interior portion comprises at least about 4 grams of liquid per liter of a total volume of the sealed interior portion.

In one arrangement, the disclosed thermal insulation products can be evacuated free of the use of energy intensive vacuum pumps thus allowing for processing and sealing (e.g., encapsulation) to occur at ambient pressures. Eliminating or at least limiting the use of energy intensive vacuum pumps to evacuate the disclosed products allows for the elimination or at least reduction in the volume or amount of at least some of the components making up the nanoporous core (e.g., such as the fibers typically present in current VIPs to maintain the structural integrity of the VIPs during the mechanical evacuation process), panel shrinkage during such mechanical evacuation thus allowing for improved (e.g., less variable) panel dimensions, energy consumption, overall process steps, capital investment, and the like. As will also be discussed below, the present thermal insulation product production processes at least substantially eliminate the need for drying of the core material (e.g., nanoporous silica) before sealing of the same within the outer gas-impermeable barrier or envelope which also reduces energy consumption, overall process steps, capital investment, product variability, and the like.

For purposes of this disclosure, "ambient" refers to the conditions (e.g., temperature and/or pressure) of the general environment within which the thermal insulation products produced according to the embodiments disclosed herein are produced. For instance, at about sea level, the production of the thermal insulation products disclosed herein would occur at an ambient pressure of about 1013 mbar, while at an elevated location such as Albuquerque, N. Mex. (e.g., elevation of about 5355'), the production would occur at an ambient pressure of about 800 mbar. Furthermore, the ambient temperature will be assumed to be a normal inside air temperature (e.g., between about 12-38° C., such as about 21° C.) where the disclosed thermal insulation products are produced.

Condensing at least a portion of the gas after the sealing step reduces the pressure within the interior portion of the gas-impermeable envelope from the first pressure down to a second pressure (e.g., a substantially evacuated pressure similar to or better than that of current VIPs) free of many of the additional process steps, capital investment, energy consumption and the like associated with having to manually evacuate (e.g., with a mechanical pump) the interior of the envelope, sufficiently drying the support material before sealing, and the like.

Generally, the reduction in pressure results from the principle that a quantity of molecules will take up less volume in an impermeable container (e.g., envelope) in a liquid state compared to the same quantity of molecules in a gaseous state (e.g., as a vapor). For instance, the vapor can be initially sealed within the gas-impermeable envelope at a temperature that is both above a condensation/boiling point of the substance making up the vapor as well as above ambient temperatures. The vapor can then be cooled down to a temperature below the condensation/boiling point of the substance making up the vapor, such as down to or above an ambient temperature, to condense at least a portion of the vapor and thereby create a lower pressure state or an at least partial vacuum within the gas-impermeable envelope.

As the vapor is initially sealed at an elevated temperature (i.e., with respective to an ambient temperature) and then cooled down to ambient to at least partially condense the vapor and thereby create and maintain the lower pressure state within the gas-impermeable envelope, the gas-impermeable envelope advantageously need not necessarily be maintained in contact with a cold source (e.g., such as a cryogenic tank or pipeline) to maintain the low pressure state within the gas-impermeable envelope in use. Furthermore, the first/initial pressure within the sealed gas-impermeable envelope (i.e., before the condensing step) can be at or slightly above ambient pressure which eliminates or at least limits the need for creating a vacuum within the gas-impermeable envelope with convention mechanical pumping mechanisms during manufacture.

Many vapors and/or vaporous mixtures are envisioned that may be sealed within the gas-impermeable enclosure and condensed (e.g., via reducing an elevated temperature of the vapor(s) down to a temperature at or above ambient temperatures) to enact the disclosed pressure reduction within the gas-impermeable envelope (which correspondingly reduces the gas phase conduction within the envelope). In one arrangement, the vapor(s) may have a thermal conductivity lower than that of nitrogen/air. Additionally or alternatively, the vapor(s) may be a vapor or vapors whose pressure within the gas-impermeable envelope drops by a larger amount than would air for a common reduction in temperature. In this regard, the vapor/vaporous mixture may be considered an "air replacement" that displaces at least some of the air that would otherwise be present within the interior portion of the gas-impermeable enclosure.

For instance, sealing air within the gas-impermeable envelope at sea level and at a temperature of about 100° C. and then cooling the gas-impermeable envelope down to a temperature of about 20° C. would cause the pressure within the gas-impermeable envelope to drop from about 1000 millibars (mbar) down to about 785 mbar. In contrast, and in accordance with one embodiment of the present disclosure, sealing steam (i.e., vaporous water or $H_2O$) within the gas-impermeable envelope at a temperature of at least about 100° C. and then cooling the gas-impermeable envelope down to a temperature of about 20° C. will cause the pressure within the gas-impermeable envelope to drop from about 1000 mbar down to a pressure below 785 mbar, such as down to about 20 mbar. In addition to or other than steam, vapors that may be sealed within the disclosed gas-impermeable envelope include, but are not limited to, paraffins such as n-pentane, chlorohydrocarbons such as carbon tetrachloride, CFCs, HCFCs, oxygenated organics such as acetone and ethylene glycol, and a wide range of vapors. For instance, the vapors may be selected based on one or more properties or characteristics of the vapors such as thermal conductivity at one or more particular temperatures, mean free path at a particular pressure and/or temperature, vapor pressure difference between two particular temperatures, and/or the like.

In one arrangement, two or more different vapors may be sealed within the gas-impermeable envelope to impart any desired properties or characteristics to the thermal insulation product to be formed (e.g., properties/characteristics not achievable through use of a single vapor). For instance, the vapor pressure/temperature curve for a vaporous mixture of two or more vapors sealed within the gas-impermeable envelope can be specifically tailored to a desired end-use of the product 100 by appropriately selecting the two or more vapors (e.g., so that the resulting vapor pressure within the product 100 achieves a desired level for a particular use temperature).

In some situations, the specific vapor(s) included within the interior portion of the gas-impermeable envelope may be chosen so that its boiling point (e.g., condensation point) is above the temperature of the particular environment and context in which the finished thermal insulation product is to be used. For instance, for relatively hot applications (e.g., process piping, ovens, environmental test chambers, aerospace, exhaust gases, etc.), it may be desirable to utilize a gas that has a boiling point higher than that of vaporous water/steam (i.e., higher than 100° C., such as at least about 300° C., 400° C., etc.) to allow the portion of the vapor to remain in the condensed/low pressure state.

In addition to the innate thermal conductivity and density of the vapor within the gas-impermeable envelope, the Knudsen effect can also be employed to reduce or otherwise control gas phase conduction within the gas-impermeable envelope. That is, increasing the mean free path of the vapor (which can be controlled by selecting one or more particular vapors and/or reducing the pressure/density of the vapor(s)) to be approximately equal to or greater than an average pore size of the support material within the gas-impermeable envelope can greatly reduce or even substantially eliminate gas phase conduction within the envelope. In this regard, at least a portion of the vapor within the interior of the sealed gas-impermeable envelope can be condensed so that the remaining vapor within the interior of the sealed gas-impermeable envelope has a mean free path about equal to or larger than an average pore size of the support material.

In one arrangement, the support material may be in the form of an adsorbent material (e.g., powder(s), particulate(s), blend(s), and/or the like) having a relatively low thermal conductivity (i.e., low solid-phase conductivity, such as not greater than 0.005 W/mK), pores sized to facilitate the Knudsen effect (e.g., nanoporous materials), and being relatively inexpensive and/or lightweight (e.g., having a density of not greater than about 250 g/l). For instance, the support material may be a particular blend comprising a fine (e.g., nanoporous) powder (e.g., fumed silica and silica aerogels), available from, for example, Evonik, Essen, Germany. In one embodiment, the support material may include at least about 60 wt % of the fine powder. In another embodiment, the support material may include about 100 wt % of the fine powder.

In some arrangements, the support material may additionally include any appropriate quantity and/or type of an IR opacifier/radiation absorbent material (e.g., titania, silicon carbide, carbon black, and/or the like) for purposes of limiting radiative heat transfer through the support material. In one embodiment, the support material includes at least about 5 wt % of the IR opacifier. In another embodiment, the support material includes not greater than about 25 wt % of the IR opacifier.

Additionally or alternatively, the support material may also include one or more lightweight fibers to enhance the structural integrity of the resulting thermal insulation product, such as polyethylene fibers, polyester fibers, other plastic fibers, carbon fibers, glass fibers, metal fibers and/or other fibers. In one embodiment, the support material may include not greater than about 0.1 wt % of fibrous materials.

Additionally or alternatively, the support material may also include any appropriate structural filler (e.g., perlite) to enhance the structural integrity of the resulting thermal insulation product. In one embodiment, the support material may include at least about 10 wt % of the structural filler. In another embodiment, the support material may include not greater than about 70 wt % of structural filler.

Additionally or alternatively, the support material may also include any appropriate getter (e.g., oxygen/nitrogen getter) such as iron, barium, lithium, zeolites, etc. to maintain the low pressure state within the gas-impermeable envelope, such as by combining with the gas molecules chemically and/or by adsorption. In one embodiment, the support material includes at least about 0.01 wt % of a getter. In another embodiment, the support material includes not greater than about 1 wt % of a getter.

In the event that the fine powder (e.g., fumed silica) is combined with one or more additional components to form the support material, all of such components may be mixed in any appropriate manner to create a substantially homogenous composition. In one approach, the power/particular adsorbent material may be mixed with an IR opacifier to create a first mixture. This first mixture may then be mixed with a fibrous material and/or structural filler material to create the support material. In another approach, the powder/particulate adsorbent material, IR opacifier, fibrous material and/or structural filler material may be mixed simultaneously to create the support material.

In one arrangement, the support material may have a total porosity of at least about 80%. In another embodiment, the support material may have a total porosity of not greater than about 98%.

In one arrangement, the support material may have an average pore size of at least about 20 nanometers. In another embodiment, the support material may have an average pore size of not greater than about 2,000 nanometers, such as not greater than about 100 nanometers to facilitate the Knudsen effect.

In one arrangement, the support material may have a surface area of at least about 50 $m^2/g$. In another embodiment, the support material may have a surface area of not greater than about 1,000 $m^2/g$.

As noted, the support material is sealed along with a vapor within an interior portion of a substantially gas-impermeable envelope before the vapor is condensed to reduce the pressure within the interior portion. Any appropriate or suitable material may be utilized to form the gas-impermeable envelope such as plastic laminates, metallized plastics, metals, metal-foils, and electroplated metals, to name a few. In one arrangement, the gas-impermeable envelope may be made of an Ethylene Vinyl Alcohol (EVOH) barrier film, a coextruded polyethylene (PE)/EVOH barrier film, a metalized EVOH barrier film, and/or the like. The type and shape of the gas-impermeable envelope may be generally related to the application in which the thermal insulation product is to be utilized. In shipping applications, for example, it may be desirable to utilize thin, panel-shaped enclosures made of a metallized plastic (e.g., metallized Polyethylene terephthalate (PET)). In one embodiment, the gas-impermeable envelope may include a thickness of at least about 25 microns. In another embodiment, the gas-impermeable envelope may include a thickness of not greater than about 300 microns.

The sealing step may be accomplished in any known manner suitable to the type of gas-impermeable envelope employed. For example, heat sealing may be used for plastic laminate enclosures and welding for metal enclosures. In relation to the former and in one embodiment, a flow wrapping machine may be utilized to seal the gas-impermeable enclosure about the support material and gas/gas mixture.

Furthermore, the condensing step may be accomplished in any appropriate manner, such as by cooling the vapor to a temperature below a boiling point of the vapor after the sealing step. In one arrangement, the gas-impermeable envelope may include spaced apart first and second sidewalls, and the cooling step may include respectively contacting the first and second sidewalls with first and second surfaces having temperatures below the boiling point of the vapor. For instance, each of the first and second surfaces may form parts of respective first and second molding members of a mold and collectively define a mold cavity. In this case, the first and second molding surfaces may be brought together over the first and second sidewalls of the envelope under slight pressure to cool the envelope and the vapor thereinside to simultaneously condense the vapor as well as form a thermal insulation product from the envelope into a desired shape (e.g., a relatively planar, rectangular-shaped panel; a non-planar shape such as an L-shaped or U-shaped panel; and/or the like).

In another arrangement, an outer surface of the gas-impermeable envelope may be contacted with a cooling liquid having a temperature below the boiling point of the vapor. For instance, a cooling liquid such as water or the like may be sprayed or otherwise applied over the outer surface of the gas-impermeable envelope to cool and thereby condense at least a portion of the vapor inside the envelope. In a further arrangement, the gas-impermeable envelope (and the vapor and support material therein) may be passively cooled under a substantially ambient temperature down to the ambient temperature to condense at least a portion of the gas inside the envelope.

In one variation, the support material and vapor may be sealed (e.g., at an ambient pressure) within a gas/vapor-permeable or porous enclosure (e.g., that is still liquid impermeable), where the gas-permeable enclosure (with the support material and vapor disposed thereinside) is sealed (e.g., again, at the same ambient pressure) within the interior portion of the gas-impermeable envelope before the vapor mixture is condensed (e.g., via cooling the gas-impermeable envelope down to ambient temperature or some temperature above ambient temperature) to lower the pressure within the gas-impermeable envelope. More specifically, it has been found that doing so provides a number of benefits such as facilitating handling of the support material and vapor, facilitating sealing of the gas-impermeable envelope (e.g., by limiting the degree to which the support material becomes disposed between the two surfaces that are to be sealed), and/or the like. For instance, the gas-permeable enclosure may be similar to those used for desiccant bags, fiberglass bundling, etc.

In one arrangement, the support material and vapor mixture may first be disposed and sealed within the gas-permeable enclosure, and then the sealed gas-permeable enclosure may be sealed within the gas-impermeable envelope (e.g., via encapsulating the gas-impermeable envelope about the sealed, gas-permeable enclosure). For instance, the support material and vapor may be simultaneously injected into the gas-permeable enclosure. As another example, the support material may be injected first and the vapor second, or vice versa. In one variation, the support material may be injected or otherwise disposed into the gas-permeable enclosure, a liquid (e.g., water) may be applied over the support material within the gas-permeable enclosure (e.g., via spraying the liquid over the support material), and the support material and liquid may then be heated above the boiling point of the liquid to convert at least some of the liquid into a gas/gas mixture and drive some or all air out of the gas-permeable enclosure.

After sealing the gas-permeable enclosure (where the sealing may be performed before or after heating the support material and liquid above the boiling point of the liquid), the sealed gas-permeable enclosure (which has the support material and vapor thereinside) may be sealed within the gas-impermeable envelope before eventually being cooled to re-condense the vapor within the gas-permeable and gas-impermeable enclosures back into the liquid state and thereby reduce the pressure within the resulting thermal insulation product. In one embodiment, and regardless of how the support material and vapor are disposed within the interior portion of the gas-impermeable envelope, a desiccant may, just before sealing of the gas-impermeable envelope, be disposed between the gas-impermeable envelope and the gas-permeable enclosure to further reduce the pressure within the sealed gas-impermeable envelope (e.g., by such as adsorbing or absorbing the condensed liquid, chemically bonding with the molecules of the condensed liquid, and/or the like).

In addition to the above-discussed advantages (i.e., no or little need for mechanical vacuum pumps, drying of the support material, etc.), the thermal insulation products produced by the processes disclosed herein can also be designed to have a reduced overall (e.g., bulk) density compared to current VIPs (e.g., 10-20% lower). For instance and in contrast to current VIPs, a smaller quantity of or even no fibrous materials needs to be utilized within the support material of the present thermal insulation products because mechanical pumping mechanisms need not be used to draw the vacuum within the present thermal insulation products. Stated otherwise, the extra structural integrity provided to the products by such fibrous materials may not be necessary as mechanical pumping mechanisms need not be used, as the present thermal insulation products need not be forcefully pressed to form the products into a desired shape, and the like.

In another regard, a smaller quantity of or even no IR opacifiers/radiation absorbent materials needs to be utilized within the support material of the present thermal insulation products as at least some of the vapors that may be sealed along with the support material within the gas-impermeable enclosure serve to absorb IR radiation and thereby limit radiative heat transfer through the thermal insulation product. For instance, when silica (e.g., nanoporous silica) is utilized as the primary insulation material in the core of current VIPs, a radiation absorbent material (e.g., carbon black) is often added in an attempt to block the "IR absorption gaps" of the silica (i.e., those IR wavelengths not absorbable by the silica). However, when silica is utilized as the adsorbent powder/particulate of the support material of the present thermal insulation products disclosed herein, a radiation absorbent material/IR opacifier need not necessarily be used in the case of at least some vapors sealed with the silica within the gas-impermeable envelope. For instance, in the case of a vapor such as steam, the condensed steam (e.g., water) tends to naturally absorb those IR wavelengths not absorbable by the silica. In this regard, the number of solid "components" making up the core of the present thermal insulation products can be reduced (e.g., by eliminating/reducing the fibrous materials and/or IR opacifier) in relation to the core of current VIPs thereby resulting in lower bulk densities and simplified manufacturing processes than those of current VIPs.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 4a is a block diagram depicting an assembly line for making the thermal insulation product of FIG. 1.

FIG. 4b is a block diagram similar to that in FIG. 4a, but at another stage of the assembly line.

FIG. 4c is a block diagram similar to that in FIG. 4b, but at another stage of the assembly line.

DETAILED DESCRIPTION

The present disclosure is generally directed to highly efficient thermal insulation products (e.g., panels, systems, methods of use, methods of manufacture, etc.) for use in insulating buildings and other enclosed environments where a temperature of the environment outside of the enclosed environments experiences temperature swings relative to the outside As will be discussed herein, the disclosed utilities allow for significant increases in thermal performance, increases in the range of operating conditions in which the disclosed utilities can be utilized, reductions in costs, and the like.

Figure 1:
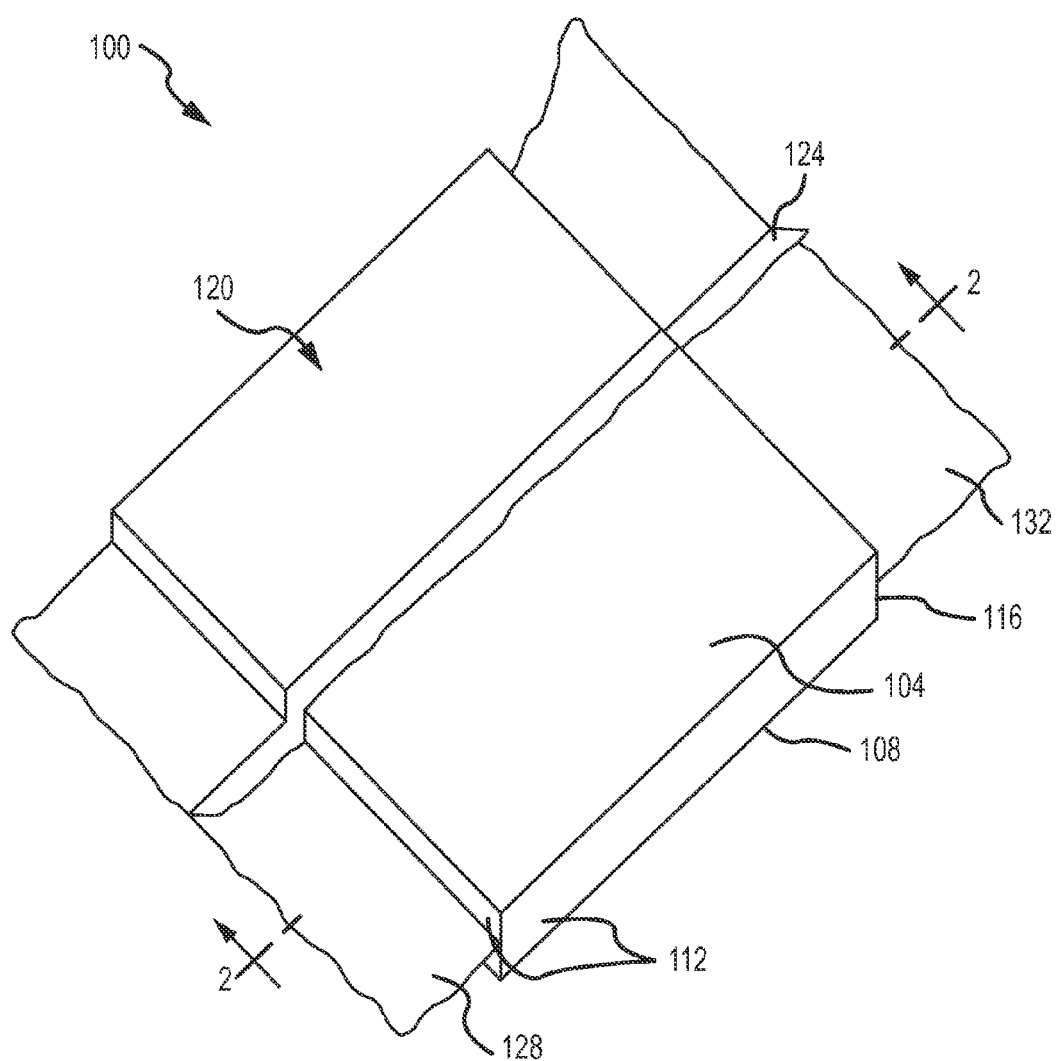
FIG. 1 is a perspective view of a thermal insulation product produced according to one embodiment disclosed herein.

FIG. 1 presents a perspective view of one thermal insulation product 100 (e.g., panel) that may be produced using the disclosed processes. As will be discussed in more detail in the discussion that follows, the product 100 may be utilized in numerous contexts where it is desired to protect an enclosed environment from heat flow into or out of its surroundings such as buildings and the like. As shown in FIG. 1, the product 100 may be in the form of a generally "planar" member having opposing first (e.g., top) and second (e.g., bottom) sides 104, 108; a plurality of outer edge portions 112; and a plurality of corner portions 116. A gas-impermeable envelope 120 (e.g., gas-tight enclosure) may form an outer boundary or layer of the product 100 and may have portions sealed together in any appropriate manner (e.g., heat seal, adhesives, etc.) along a hermetically sealed portion 124 to seal an insulative core thereinside as will be discussed in more detail below.

The gas-impermeable envelope 120 may be constructed from any appropriate material(s) such as plastic laminates, metallized plastics, metals, metal-foils, electroplated metals, and/or the like. Depending upon the particular sealing process utilized, the gas-impermeable envelope 120 may have a number of flaps such as first and second flaps 128, 132 that may, if desired, be folded and secured onto the first or second surfaces 104, 108 of the product 100, at least partially cut off and removed, and/or the like. While the product 100 has been shown in FIG. 1 in the form of a generally planar panel, it is to be understood that the process disclosed herein may be utilized to make numerous other shapes, forms, sizes, contours, etc. of products 100 such as cylindrical-shaped, L-shaped, U-shaped, trapezoidal, square-shaped, angled edges, tongue in groove edges, etc.

Figure 2A:
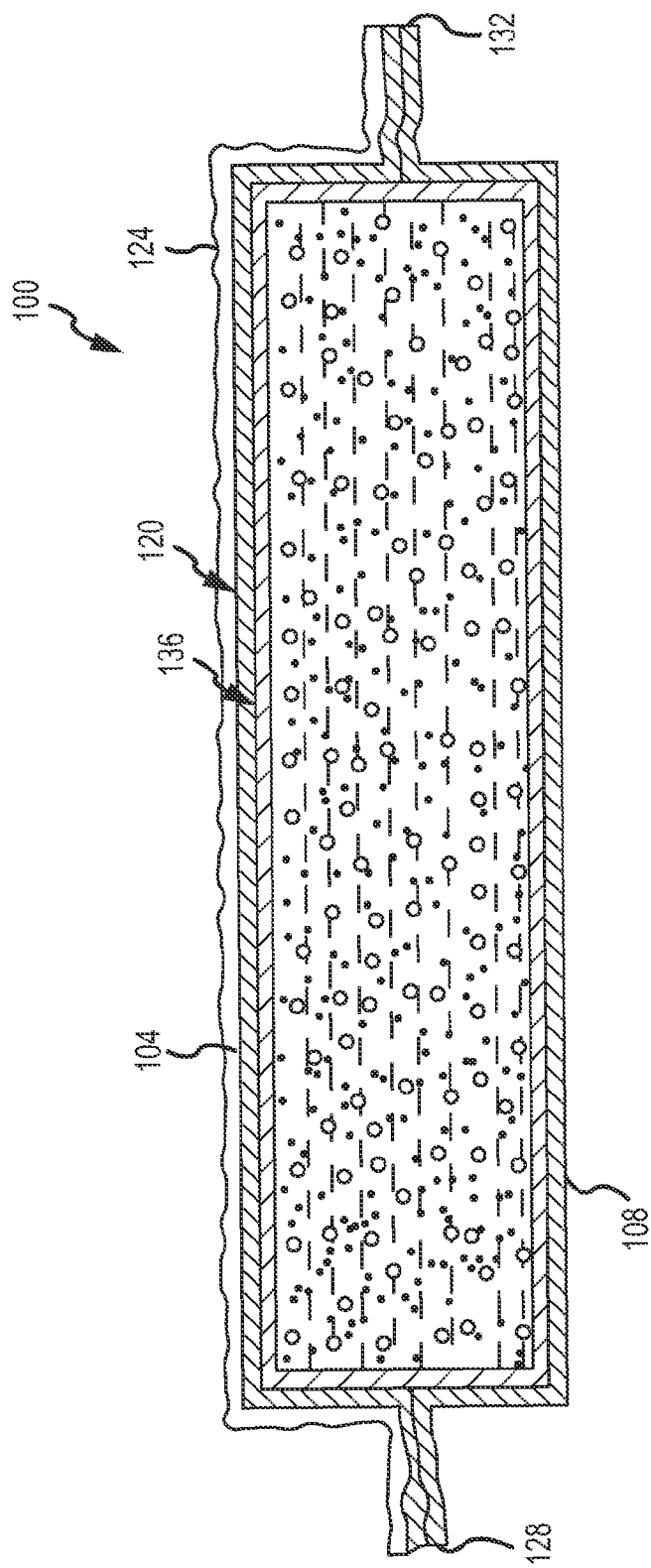
FIG. 2a is a sectional view of the panel of FIG. 1 before condensing of vapor within an interior of the product to reduce the pressure within the product.
Figure 2B:
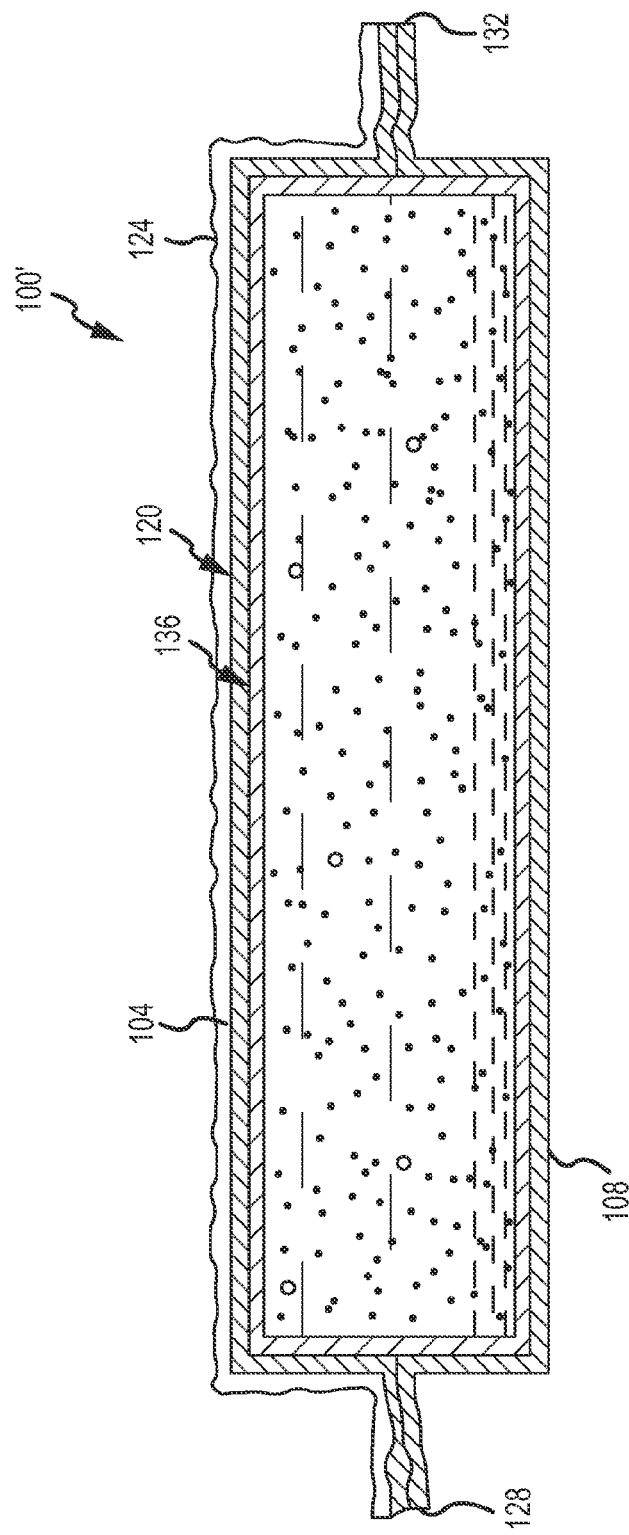
FIG. 2b is a sectional view similar to that in FIG. 2, but after condensing of at least some of the vapor within the interior of the product to reduce the pressure within the product.
Figure 3:
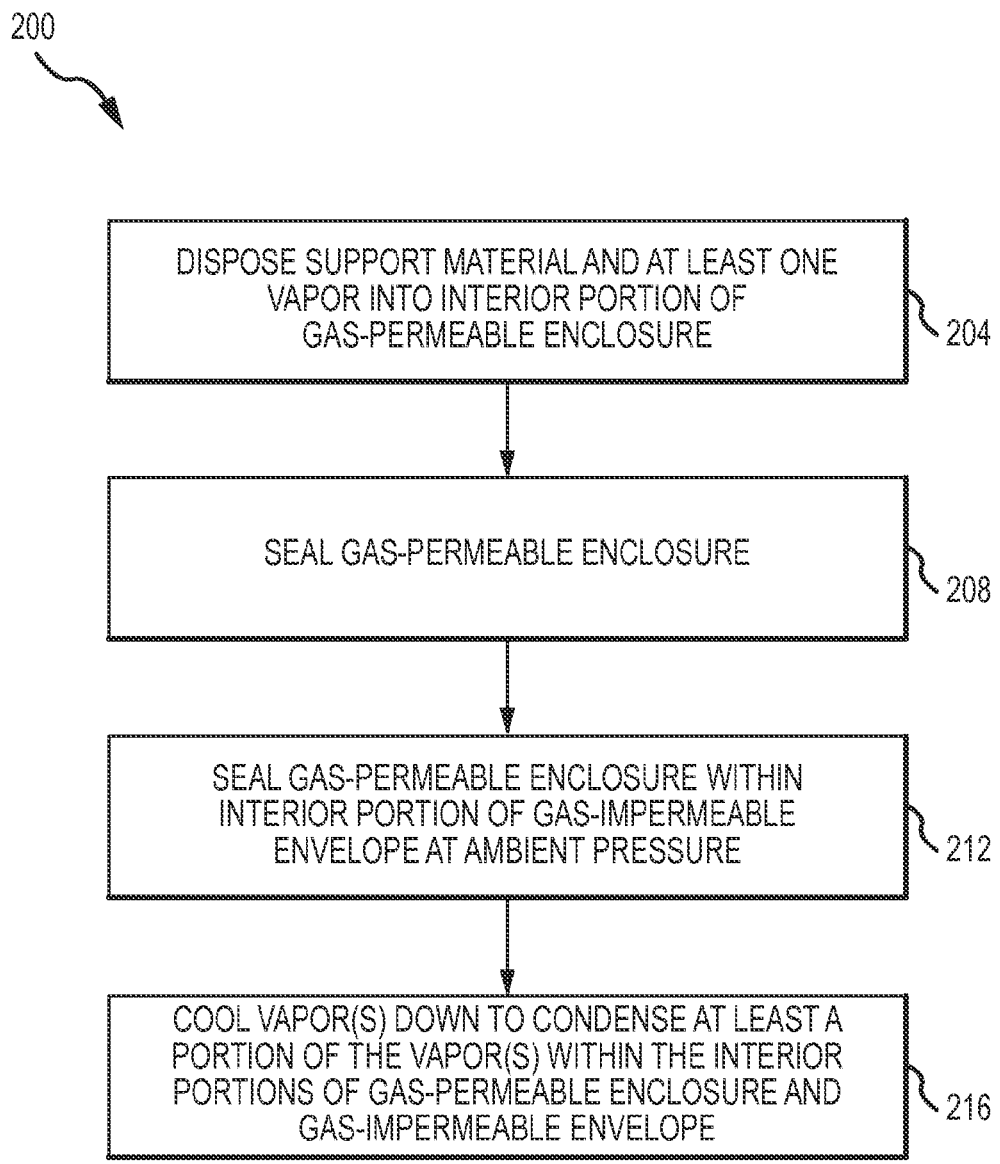
FIG. 3 is a flow diagram illustrating a method of making the thermal insulation product of FIG. 1, according to one embodiment.

Turning now to FIG. 3, one embodiment of a method 200 for making the thermal insulation product 100 of FIG. 1 will now be discussed. In conjunction with FIG. 3, reference will also be made to the sectional views of the product 100 presented in FIGS. 2a-2b as well as to the various stages of an assembly line 300 for producing the product 100 presented in FIGS. 4a-4e. As shown in FIG. 3, the method 200 may include disposing 204 a support material (e.g., core) and at least one vapor into an interior portion of a gas-permeable enclosure (e.g., a porous barrier such as that used for desiccant bags, fiberglass bundling, etc.) and then sealing 208 the support material and the at least one vapor within the interior portion of the gas-permeable enclosure (e.g., where the disposing 204 and sealing 208 substantially occur at an ambient pressure).

As discussed previously, the support material may be in the form of an adsorbent material (e.g., powder(s), particulate(s), blend(s), and/or the like) having a relatively low thermal conductivity and pores sized to facilitate the Knudsen effect (e.g., a fine powder such as fumed silica, silica aerogels, etc.). In some situations, one or more additives may be mixed in with the adsorbent material (and thereby form part of the support material) to add one or more desired properties or qualities to the support material (and thereby the product 100 to be formed). For instance, one or more of an IR opacifier (to limit radiative heat transfer through the support material), a lightweight fibrous material and/or a structural filler material (to enhance the structural integrity of the product 100 to be formed), a getter (to maintain the low pressure or evacuated state within the product 100 to be formed), and/or the like may be included.

Furthermore, many vapors and/or vaporous mixtures are envisioned that may be disposed and sealed within the gas-permeable enclosure along with the support material. The vapor may be a vapor with relatively low thermal conductivity (e.g., lower than that of nitrogen/air) and/or may be a vapor whose pressure drops by a desired amount along with a particular reduction in temperature. As discussed herein, the vapor is, once sealed within a gas-impermeable envelope, cooled and condensed to reduce the pressure within the gas-impermeable envelope. In this regard, it may be advantageous to utilize vapors that have a boiling point above the operating temperatures of the environment in which the product 100 to be formed is to be used so that the vapor remains condensed and the inside of the product 100 remains in the low pressure state during use of the product 100.

In addition to or other than steam (i.e., water), vapors that may be sealed within the gas-permeable envelope include, but are not limited to, paraffins such as n-pentane, chlorohydrocarbons such as carbon tetrachloride, CFCs, HCFCs, oxygenated organics such as acetone and ethylene glycol, and/or a wide range of vapors.

With reference to FIG. 2a, for instance, the support material (represented by the pattern of dots) and the at least one vapor (represented by the series of dashed lines and small circles) may be disposed and sealed within an interior portion gas-permeable enclosure 136 in any appropriate manner. Turning to FIG. 4a, for instance, the support material and at least one vapor may be initially maintained in respective enclosures 308, 312 (e.g., tanks, pipes, vessels, etc.) as part of an assembly line 300 that may be used to make the thermal insulation products 100 disclosed herein. The enclosures 308, 312 may be respectively fluidly interconnected (e.g., via pipes, tubes, valves, etc.) to a chamber 316 to allow for the injection of the support material and at least one vapor into the chamber 316 and intermixing thereof. For example, a gas-permeable enclosure 136 may be moved along the assembly line 300 via a conveyor belt 304 or the like from one position as shown in FIG. 4a to another position as shown in FIG. 4b, whereupon a mixture of the support material and the at least one vapor may be injected or otherwise appropriately disposed into the gas-permeable enclosure 136. The gas-permeable enclosure 136 may then be sealed in any appropriate manner (e.g., such as by heat-sealing; adhesive; welding such as RF welding, solvent welding, or ultrasonic welding; and/or the like) to contain the support material and at least some of (e.g., most of) the vapor within an interior portion thereof.

As discussed, the at least one vapor, once sealed within the gas-impermeable envelope 120, will be eventually cooled down to a temperature below a boiling point of the at least one vapor (e.g., at or above an ambient temperature) to reduce the pressure within the gas-impermeable envelope 120 (as well as to eliminate or at least reduce the need to maintain the product 100 in contact with a cold source to maintain the vapor in the condensed, low-pressure state). In this regard, at least a portion of the assembly line 300, such as between and including the injection of the support material/gas mixture from the chamber 316 into the gas-permeable enclosure 136 up to the sealing of the sealed gas-permeable enclosure 136 within the gas-impermeable envelope 120 (e.g., at station 320, discussed below), may be maintained within any appropriate heating zone 328 that is configured to maintain the at least one vapor at a temperature above its boiling point and limit premature condensation of the vapor. For instance, the heating zone 328 may be in the form of an enclosure made up of vinyl drapes, plastic walls, insulated walls, air curtains, and/or the like.

The support material and at least one vapor need not necessarily be injected substantially simultaneously into the chamber 316 or even into the interior portion of the gas-permeable enclosure 136. In one arrangement, the support material may be injected from the enclosure 308 into the gas-permeable enclosure 136 (e.g., with or without passing through the chamber 316), and then the at least one vapor may be injected from the enclosure 312 into the gas-permeable enclosure 136 (e.g., also with or without passing through the chamber 316). In another arrangement, the support material may be injected or otherwise disposed into the gas-permeable enclosure 136; a liquid (e.g., water) may be applied over the support material (either before or after the support material is injected into the gas-permeable enclosure 136); and then the support material may be heated above the boiling point of the liquid to convert at least some of the liquid into the at least one vapor and thereby drive some or all air out of the gas-permeable enclosure 136. Other manners of disposing and sealing the support material and at least one vapor into the interior portion of the gas-permeable enclosure 136 are also envisioned and included within the scope of the present disclosure.

Once the support material and at least one vapor have been sealed within the interior portion of the gas-permeable enclosure 136, the method 200 of FIG. 3 may include sealing 212 the sealed gas-permeable enclosure 136 within an interior portion of a gas-impermeable envelope (e.g., at a pressure substantially equal to an ambient pressure). FIG. 2a illustrates the sealed gas-permeable enclosure 136 (having the support material and at least one vapor contained therein) being sealed within an interior portion of the gas-impermeable envelope 120. At this point, for instance, the sealed interior portion of the gas-impermeable envelope 120 may have about 1 gram of a liquid per liter of a total volume of the sealed interior portion of the gas-impermeable envelope 120 (e.g., at a pressure substantially equal to ambient pressure).

In one arrangement, the sealed gas-permeable enclosure 136 may be moved along the assembly line 300 by the conveyor belt 304 from the position shown in FIG. 4b to that shown in FIG. 4c whereupon the sealed gas-permeable enclosure 136 may enter a gas-impermeable envelope encapsulation/sealing station 320. For instance, the station 320 may include at least a portion of a flow wrapping machine (e.g. including spools/reels of the gas-impermeable envelope material, heat sealing equipment, etc., not shown) operable to wrap and seal the sealed gas-permeable enclosure 136 within the gas-impermeable envelope 120. In some situations, any appropriate desiccant may be included within the interior portion of the gas-impermeable envelope 120 but outside of the gas-permeable enclosure 136 for use in further reducing vapor pressure within the gas-impermeable envelope 120 upon cooling. In any event, the sealing 212 may occur with the at least one vapor being at a temperature above an ambient temperature (e.g., such as just outside of the heated zone 328).

After the sealing 212, the method 200 of FIG. 3 may then include cooling 216 the at least one vapor (which is contained along with the support material within the interior portion of the gas-impermeable envelope 120) down to a temperature that is at least below the boiling point of the vapor (i.e., the substance(s) making up the vapor) to condense at least a portion of the at least one vapor within the gas-impermeable envelope 120 and thereby reduce the pressure within the gas-impermeable envelope 120 from a first pressure upon the sealing 212 down to a second pressure after the cooling 216 (e.g., free of energy intensive pumping mechanisms). For instance, the at least one vapor may be cooled down to a temperature that is at or above an ambient temperature. In one arrangement, the difference between the first and second pressures may be at least about 250 mbar, such as at least about 500 mbar at least about 700 mbar, or even at least about 900 mbar. In another arrangement, the reduced second pressure may be not greater than about 700 mbar, such as not greater than about 500 mbar, not greater than about 300 mbar, such as not greater than about 100 mbar, or even not greater than about 50 mbar. In a further arrangement, a time between the completion of the sealing 212 and the reduction of the first pressure to the second pressure during the cooling 216 may be not greater than about 60 minutes, such as not greater than about 10 minutes.

Turning now to FIG. 2b which illustrates a sectional view of the product 100' after the cooling 216, it can be seen how at least a portion of the at least one vapor (represented by the series of dashed lines and small circles in FIG. 2a) has condensed into a liquid phase (represented by the tighter series of dashed lines at the bottom of the interior portion of the gas-permeable enclosure 136 and gas-impermeable envelope 120 in FIG. 2b). It can also be seen how any remaining vapor within the interior portion of the gas-impermeable envelope 120 after the cooling 216 is in a reduced density or expanded state in FIG. 2b compared to in FIG. 2a (e.g., note how the series of dashed lines and small circles is less dense in FIG. 2b compared to in FIG. 2a). In other words, the cooling 216 converts at least a portion of the vapor into a liquid phase so that the ratio of molecules within the interior portion of the gas-impermeable envelope 120 in the gas phase compared to those in the liquid phase decreases resulting in a decrease in pressure within the gas-impermeable envelope 120.

In one arrangement, the sealed interior portion may have at least about 2 grams of a liquid per liter of a total volume of the sealed interior portion of the gas-impermeable envelope 120 after the condensing/cooling 216. For instance, the sealed interior portion may have at least about 3 grams of a liquid per liter of a total volume of the sealed interior portion of the gas-impermeable envelope 120 after the condensing/cooling 216 (e.g., at least about 4 grams of a liquid per liter). As another example, the sealed interior portion may have not greater than about 7 grams of a liquid per liter of a total volume of the sealed interior portion of the gas-impermeable envelope 120 after the condensing/cooling 216, such as not greater than about 6 grams of a liquid per liter (e.g., not greater than about 5 grams of a liquid per liter).

As another example, the grams of liquid per liter of the total volume of the sealed interior portion of the gas-impermeable envelope 120 may be at least about two times greater (e.g., three times greater, four times greater, etc.) after the condensing/cooling 216 as compared to before the condensing/cooling 216 (e.g., such as just after the sealing 212). It is noted that the liquid has been illustrated as being concentrated at the bottom of the interior portion of the gas-impermeable envelope 120 for purposes of facilitating the reader's understanding of the present disclosure and that the liquid may in reality be more disbursed within the support material throughout the interior portion of the gas-impermeable envelope 120.

For instance, imagine that the at least one vapor was steam and that it was sealed along with the support material within the interior portion of the gas-impermeable envelope 120 at a temperature of just over about 100° C. In this regard, the pressure within the interior portion of the gas-impermeable envelope 120 may be about 1000 mbar (e.g., at or close to ambient pressure). Upon cooling of the gas-impermeable envelope 120 (and the steam and support material thereinside) down to a temperature at about ambient temperature (e.g., down to about 20° C.), the pressure within the interior portion of the gas-impermeable envelope 120 may drop to only about 20 mbar. The pressure within the gas-impermeable envelope 120 may thus advantageously substantially remain at the 20 mbar level (or other low pressure level) for uses of the resulting product 100 in temperatures substantially the same as the ambient temperature at which the product 100 was cooled 212.

For other vapors (e.g., n-pentane), the interior portion of the gas-impermeable envelope 120 may have a first temperature during the sealing step different (e.g., less) than that at which steam was sealed 212 within the envelope 120, such as about 70° C., and/or a second temperature after the cooling step 216 different (e.g., greater) than that to which the envelope 120 was cooled 216, such as about 40° C. Of course, further pressure reductions within the product 100 may result in cold applications (e.g., refrigeration, shipping containers) in which the product 100 is disposed adjacent a cold source that causes further condensation of vapor remaining within the product 100. Additional pressure reductions may result from the use of different types of support material, pore sizes or overall porosities thereof, getters, and/or the like.

Before referring back to the method 200 and assembly line 300, a further advantage of the finished/resulting thermal insulation products 100 will now be discussed. For instance, transient thermal performance of insulation products (e.g., the ability to resist temperature equilibration between first and second sides of an insulation product) can become important for applications in which the "hot" and "cold" temperatures respectively adjacent the opposing first and second surfaces of the products are not temporally independent of each other (e.g., construction, refrigerated trucking, and/or the like). Stated differently, transient performance of an insulation product becomes important when at least one of the first and second surfaces of the insulation product experiences temperature swings relative to the other surface.

Specifically, thermal diffusivity is a measure of transient performance governing the timescale for a material to equilibrate to a change in conditions and depends upon the thermal conductivity, density and heat capacity of the material or product (where thermal diffusivity ($\alpha$) is equal to the thermal conductivity ($\lambda$) divided by the density ($\rho$) and heat capacity ($C_p$)). For instance, the characteristic time (i.e., for the temperatures on the first and second surfaces of the product to equilibrate, where characteristic time increases with the square of the insulation product thickness) for a 25 mm thick piece of Expanded Polystyrene (EPS) foam insulation is on the order of a few minutes while that of current VIPs is on the order of an hour or two. Generally, transient thermal performance increases with increasing characteristic time.

Before accounting for any phase changing effects of materials/components in the core of an insulation product (e.g., occurring during a temperature change adjacent a first side of an insulation product relative to an opposing second side of the insulation product) on transient performance of the insulation product, current VIPs and the present thermal insulation products 100 may have comparable transient performance (e.g., both on the order of about an hour or two). However, the increased water content of the present thermal insulation products 100 (e.g., about 4 g/l, such as at least about 6 g/l, or higher) compared to that of current VIPs (e.g., 0.5 g/l or less) may result in a greater degree of phase changing of liquid into a vapor during temperature swings adjacent one side of the products 100 and corresponding increased transient performance of the present thermal insulation products 100 relative to current VIPs. In one arrangement, at least about 50 g/m$^3$ (e.g., at least about 80 g/m$^3$, 100 g/m$^3$, 150 g/m$^3$, etc.) of the liquid within the sealed interior portion of the disclosed thermal insulation product is operable to evaporate from adjacent one of the first and second opposing surfaces or sides and condense adjacent the other of the first and second opposing surfaces or sides during each temperature fluctuation cycle. In another arrangement, at least about 10% (e.g., such as at least about 30%, 50%, 70%, etc.) of the liquid within the sealed interior portion may be operable to evaporate from adjacent one of the first and second opposing sides or surfaces of the disclosed thermal insulation product and condense adjacent the other of the first and second opposing surfaces during each temperature fluctuation cycle.

Figure 5:
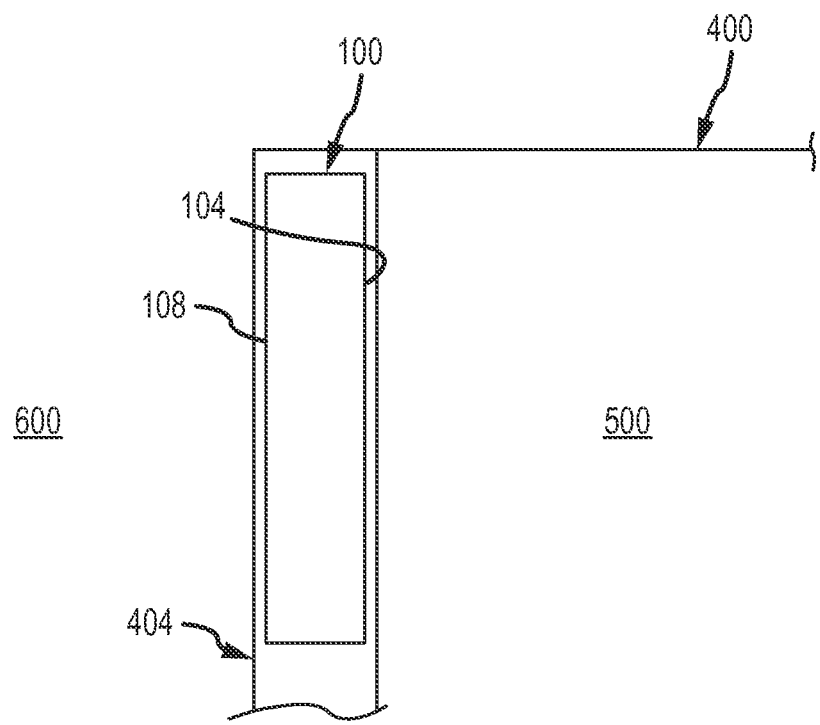
FIG. 5 is a simplified schematic side view of a portion of a wall structure of a building with the thermal insulation product of FIG. 1 disposed within or adjacent the wall structure.

Assume that each of a current VIP and a present thermal insulation product 100 was independently used as insulation for an outside wall of a building. For instance, FIG. 5 presents a simplified schematic side view of a thermal insulation product 100 disclosed herein being disposed within or adjacent an outside wall structure 404 of a building 400 (e.g., house, apartment complex, commercial structure, etc.). While not shown, the outside wall structure 404 may include any appropriate framing members (e.g., studs, joists, etc.), sheathing, wall boards, and the like. Assume that an enclosed environment 500 of the building 400 (e.g., adjacent or near the outside wall structure 404) is always about 20° C. inside but that an outside ambient environment 600 (e.g., adjacent or near the outside wall structure 404) swings between 5° C. at night (e.g., assume 12 hours at 5° C. to idealize) and 35° C. during the day (e.g., also assume 12 hours to idealize). In this case and without taking into account phase changing effects of the liquid in the present thermal insulation product 100 occurring during the temperature swings, about 29.6 WHr/m2 (106,560 J/m$^2$) of heating and 29.6 WHr/m$^2$ (106,560 J/m$^2$) of cooling would be needed for one day for each of the current VIP and present thermal insulation product (e.g., assuming the characteristic time is much less than the 12 hour diurnal scales).

However, the phase changing of the liquid in the present thermal insulation product 100 into vapor during the temperature swings of the outside ambient environment 600 serves to increase the transient performance of the thermal insulation product 100 by further cooling the first or second side of the thermal insulation product 100 during evaporation of the liquid depending upon which of the first and second sides is the "hot" side and which is the "cold" side. For instance, imagine that the first and second surfaces 104, 108 of the thermal insulation product 100 were respectively adjacent the inside and outside of the building 400 as shown in FIG. 5. Further assume that the outside ambient environment 600 is initially at 5° C. and that the inside/enclosed environment 408 of the building 400 is at 20° C. In this case, the relatively lower 5° C. temperature of the outside ambient environment 600 compared to the 20° C. temperature of the inside/enclosed environment 500 of the building 400 may cause vapor within the product 100 to condense adjacent the second surface 108 (e.g., as shown in FIG. 2b).

However, as the second surface 108 of the thermal insulation product 100 heats owing to the outside ambient environment 600 increasing from 5° C. to 35° C. in this example, at least some of the liquid formerly condensed adjacent the second surface 108 on the inside of the thermal insulation product 100 evaporates (e.g., 100 g/m$^3$) and subsequently condenses on the inside of the thermal insulation product 100 adjacent the first surface 104 (e.g., because the inside/enclosed environment 500 of the building 400 near or adjacent the first surface 104 is now colder (20° C.) than is the outside ambient environment 600 near or adjacent the second surface 108 (35° C.)). As the condensed liquid adjacent the second surface 108 of the thermal insulation product 100 absorbs energy (e.g., heat) from the second surface 108 to evaporate into a vapor, the net result is a cooling effect adjacent the second surface 108 of the thermal insulation product 100 and a corresponding increase in transient thermal performance of the thermal insulation product 100 (e.g., due to the aforementioned cooling effect tending to increase the characteristic time of the thermal insulation product 100 or, in other words, the time to temperature equilibrium between the first and second surfaces 104, 108 of the thermal insulation product 100).

Once the outside ambient environment 600 begins cooling again (e.g., down to the 5° C. temperature in this example), the above discussed process reverses whereby condensed liquid adjacent the first surface 104 of the thermal insulation product 100 evaporates and condenses adjacent the second surface 108 of the thermal insulation product 100 (e.g., due to the relatively hotter temperature (20° C.) of the enclosed environment 500 relative to outside ambient environment 600 (5° C.)) resulting in a cooling effect adjacent the first surface 104 of the thermal insulation product 100. In the event that the time required to "pump" the fluid from the first surface 108 to the second surface 104 (and vice versa) approaches the diurnal timescales, transient thermal performance can be greatly increased in relation to current VIPs.

Figure 6:
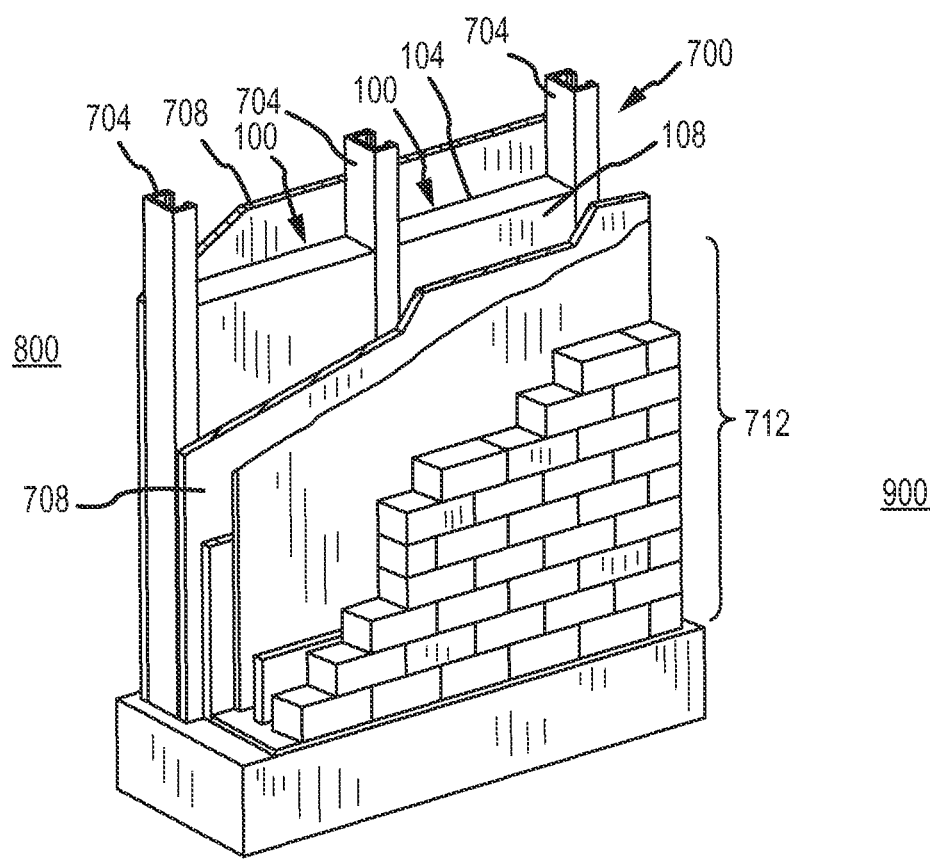
FIG. 6 is a perspective view of a wall structure of a building that incorporates a number of thermal insulation products of FIG. 1, according to an embodiment.

The thermal insulation products 100 disclosed herein may be incorporated into a building and/or components thereof (e.g., walls, frames, panels, etc.) in numerous manners for purposes of insulating the same. Turning now to FIG. 6, a perspective view of a portion of a wall structure 700 of a building that incorporates a number of thermal insulation products of FIG. 1 according to an embodiment is presented. It is to be understood that thermal insulation products disclosed herein may be incorporated into wall structures (e.g., outside wall structures, inside wall structures, roof structures, etc.) of buildings in numerous manners (e.g., as shown in FIG. 6 and/or in other manners) consistent with the teachings presented herein.

As shown, the wall structure 700 may include a number of framing members 704 (e.g., studs, channels, joists, rafters, etc. of any appropriate material(s) such as wood, metals, composites, etc.) spaced by any appropriate distance. One or more thermal insulation products 100 may be appropriately disposed or arranged relative to the framing members 704 for purposes of limiting heat transfer through the wall structure 700 from an outside ambient environment 900 into an inside enclosed environment 800 of the building and vice versa. For instance, one or more thermal insulation products 100 may be appropriately disposed between adjacent ones of the framing members 704. In one arrangement, a number of sheathing members 708 (e.g., gypsum board, drywall, particle board, plywood, etc.) may be appropriately disposed over and/or secured to opposite sides of the framing members 704 so as to enclose the thermal insulation products 100 therebetween. Any other appropriate number and/or type of additional sheathing members or components 712 may also be disposed over and/or secured to one or more of the sheathing members 708 such as flashing, spray foam insulation, masonry (e.g., bricks, stone, marble, etc.), siding (e.g., vinyl, metal, etc.), and/or the like. While not shown, the wall structure 700 may be one of a number of interconnected wall structures of one or more buildings, where each interconnected wall structure includes one or more thermal insulation products 100 disposed therein or relative thereto for purposes of limiting heat transfer into and out of the interior of the building(s).

In one arrangement, the one or more thermal insulation products 100 may be disposed over the framing members 704 in addition to or as an alternative to positioning thermal insulation products between adjacent framing members 704 as shown in FIG. 6. As just one example, any appropriate foam (e.g., spray) insulation may be disposed between adjacent ones of the framing members 704 and then one or more thermal insulation products 100 may be disposed over the framing members 704 (e.g., with or without one or more sheathing members 708 disposed therebetween). In another arrangement, any appropriate composite and/or modular (e.g., prefabricated) wall panels may be constructed that incorporate one or more thermal insulation products 100 therein. While the thermal insulation products 100 have been illustrated as being incorporated into a vertical wall structure, thermal insulation products 100 may also be incorporated into numerous other structures of a building or the like (e.g., horizontal wall structures, roofs, etc.).

Figure 4D:
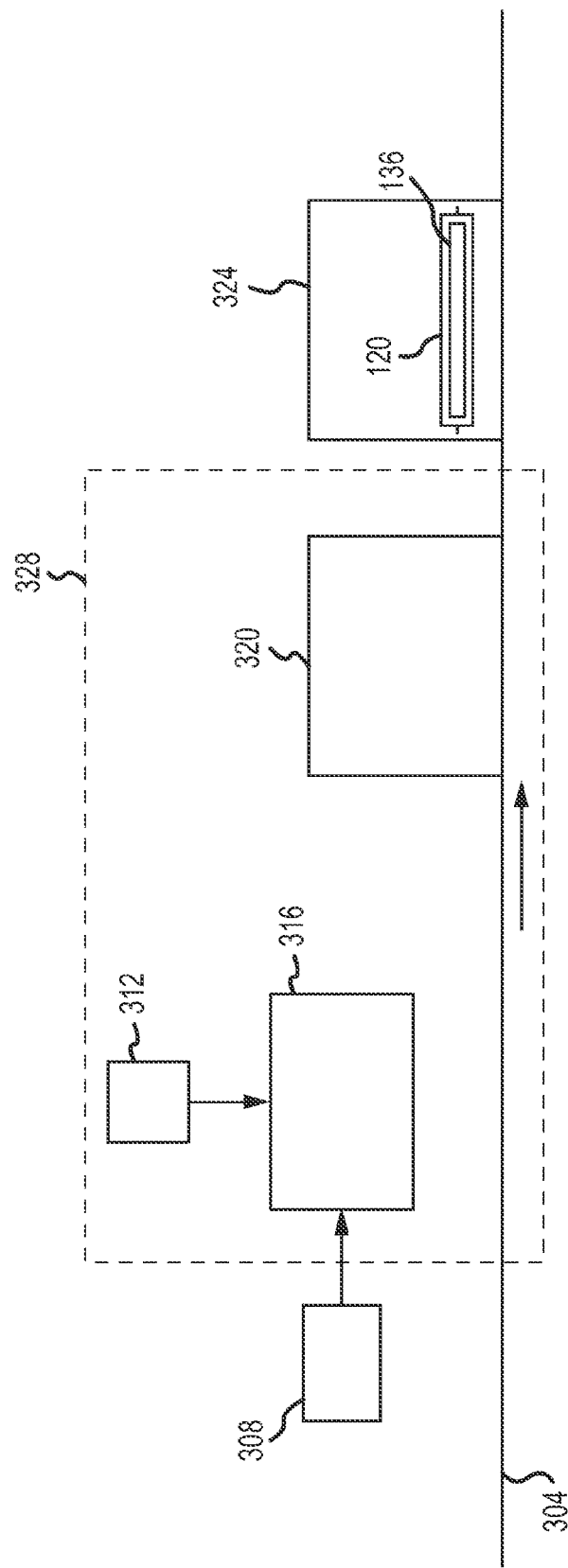
FIG. 4d is a block diagram similar to that in FIG. 4c, but at another stage of the assembly line.

With reference back to the assembly line 300 of FIG. 4c, the sealed gas-impermeable envelope 120 may be moved along the assembly line 300 by the conveyor belt 304 from the position shown in FIG. 4c to that shown in FIG. 4d whereupon the sealed gas-permeable enclosure 120 may enter any appropriate cooling station 324 designed to cool the at least one vapor below its boiling point to condense at least a portion of the vapor into a liquid phase. In one arrangement, the cooling station 324 may include opposing plates or surfaces having temperatures below the boiling point of the at least one vapor, where the opposing surfaces are configured to respectively contact the first and second sides 104, 108 (e.g., see FIG. 2b) of the product 100.

For instance, the first and second surfaces may lightly contact or press the first and second sides 104, 108 of the product 100 to simultaneously cool the vapor below its boiling point (e.g., down to an ambient temperature) and form the product 100 into more precise or exact dimensions, but need not exert any substantial amounts of pressure against the first and second sides 104, 108 of the product 100 (e.g., because only minimal pressure may be required to maintain thermal contact and guide shrinkage into a desired final shape). In one embodiment, at least one of the opposing surfaces may have a depression, cavity, or the like, the shape of which is a desired shape of the product 100 to be formed (e.g., similar to a mold cavity).

Figure 4E:
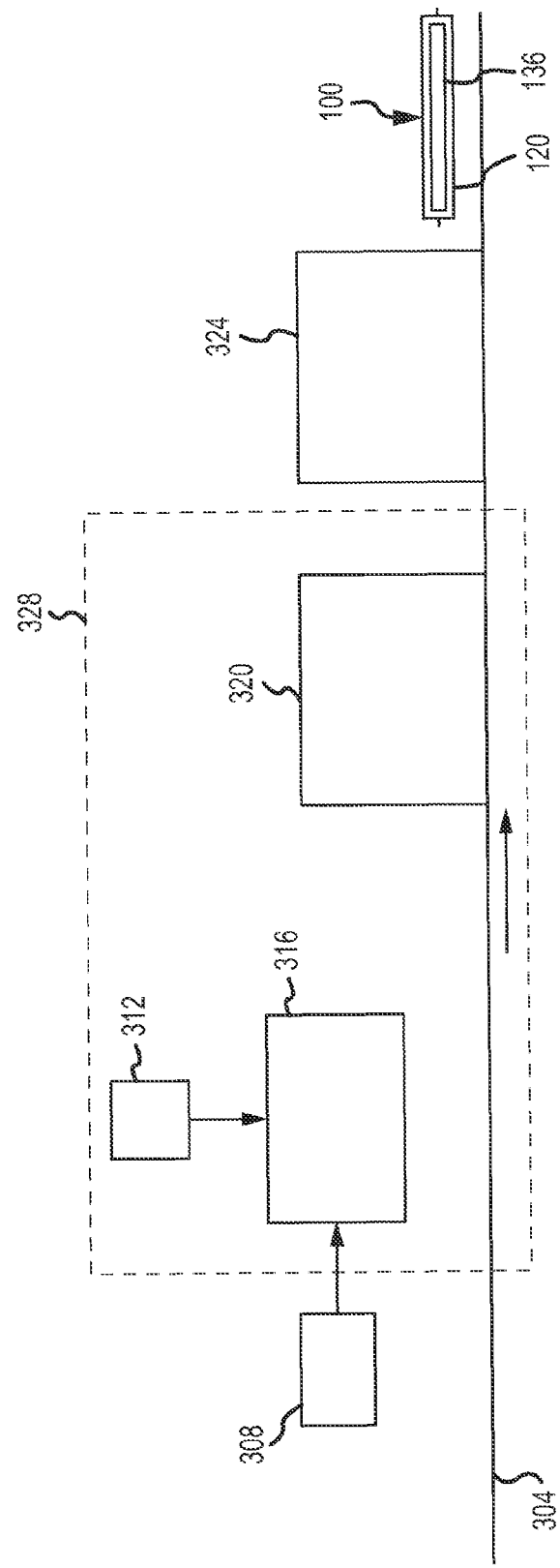
FIG. 4e is a block diagram similar to that in FIG. 4d, but at another stage of the assembly line.

For instance, movement of at least one of the surfaces towards the other of the surfaces may cause the product 100 to fill and expand in the cavity until the product 100 has assumed the shape of the cavity. As a result, the product 100 may be able to achieve increased dimensional stability and/or tighter tolerances. In another arrangement, the cooling station 324 may be configured to spray a cooling liquid such as water or another liquid (e.g., having a temperature below the boiling point of the gas) over the outside of the product 100 to accelerate condensation of the vapor therewithin. In any event, the conveyor belt 304 may eventually move the finished product 100 out of the cooling station 324 as shown in FIG. 4e whereupon the product 100 may be ready for use, subjected to additional processing (e.g., securing or removal of the flaps 128, 132; quality control; etc.). In one arrangement, the finished product 100 may have a density (e.g., bulk density) of at least about 80 g/l. In another arrangement, the finished product 100 may have a density of not greater than about 280 g/l. In one arrangement, the finished product 100 may have a thermal resistance of at least about 0.5 $m^2 \cdot K/W$. In one arrangement, the finished product 100 may have a thermal conductivity of not greater than about 0.010 W/mK at room temperature. In one arrangement, a distance between the first and second sides 104, 108 of the finished product 100 may be at least about 2 mm. In another arrangement, the distance between the first and second sidewalls may be not greater than about 50 mm.

Thus, the present disclosure contemplates new methods of producing thermal insulation products that have significant advantages over previous/current manners of making VIPs as well as the resulting thermal insulation products themselves. The resulting thermal insulation products may be used in a variety of applications, such as in the insulation of pipes, electronics, energy sources, apparel, shipping containers, appliances, and other uses for which high thermal efficiency and/or space savings is desirable. The thermal insulation products may be produced in any suitable shape, size, form and/or arrangement, as desired for the application to which it will be applied.

It will be readily appreciated that many additions and/or deviations may be made from the specific embodiments disclosed in the specification without departing from the spirit and scope of the invention. In one arrangement, the gas-impermeable envelope and vapor thereinside may be cooled 216 (e.g., by the cooling station 324 of FIG. 4d) down to an initial temperature (e.g., about 60° C. in the case of the vapor being steam) at which the gas-impermeable envelope can at least maintain a desired shape so that a plurality of sealed gas-impermeable envelopes can be stacked or otherwise stored for future use. For instance, cooling steam down to about 60° C. may cause the pressure within the sealed gas-impermeable envelope to drop from about 1000 mbar if produced near sea level (e.g., upon initial sealing 212) down to about 150 mbar. Thereafter, continued ambient cooling of the sealed gas-impermeable envelopes while stacked or otherwise stored (e.g., down to an ambient temperature such as 21° C.) may cause further pressure reductions within the sealed gas-impermeable envelopes and thus finished products 100 (e.g., down to about 20 mbar or the like).

EXAMPLE

A thermal insulation panel is manufactured by way of disposing a support material (including 90 wt. % fumed silica and 10 wt. % silicon carbide) and steam at a temperature of about 100° C. within a gas-permeable enclosure (Imperial RB1, product 39317 manufactured by Hanes Engineered Materials) at ambient pressure, sealing the sealed gas-permeable enclosure within a gas-impermeable envelope (Cryovak PFS8155 manufactured by the Sealed Air Corporation) at ambient pressure and with the steam maintained at the temperature of about 100° C., and then cooling the gas-impermeable envelope (including the steam thereinside) for about 5 min down to a temperature of about 35° C.

After the temperature inside the gas-impermeable envelope drops down to about 20° C., the pressure within the resulting thermal insulation panel is about 8 mbar.

When measured with a cold side temperature of about 5° C. and a hot side temperature of about 25° C., the thermal conductivity of the thermal insulation panel is about 0.004 W/mK.

The bulk density of the thermal insulation panel is about 140 g/l.

As will be appreciated, the embodiments described above are for exemplary purposes only and are not intended to limit the scope of the present invention. Various adaptations, modifications and extensions of the described method will be apparent to those skilled in the art and are intended to be within the scope of the invention as defined by the claims that follow.

What is claimed is:

1. A method of insulating a building, comprising:
   positioning a plurality of thermal insulation products relative to a frame of a building;
   wherein each thermal insulation product comprises a substantially gas-impermeable envelope including first and second opposing surfaces and a sealed interior portion between the first and second opposing surfaces, a support material within the sealed interior portion of the gas-impermeable envelope, and at least about 1 grams of a liquid per liter of a total volume of the sealed interior portion disposed within the sealed interior portion;
   wherein the positioning includes orienting the plurality of thermal insulation products so that the first opposing surface faces an interior of the building and the second opposing surface faces an outside ambient environment;
   wherein at least a portion of the liquid is operable to evaporate from adjacent the first opposing surface and subsequently condense adjacent the second opposing surface when a temperature of the interior of the building is greater than a temperature of the outside ambient environment; and
   wherein at least a portion of the liquid is operable to evaporate from adjacent the second opposing surface and subsequently condense adjacent the first opposing surface when a temperature of the interior of the building is less than a temperature of the outside ambient environment.

2. The method of claim 1, wherein the positioning step comprises:
   arranging at least some of the plurality of thermal insulation products relative to a plurality of structural members of the building frame.

3. The method of claim 2, wherein the arranging step comprises:
   disposing at least some of the plurality of thermal insulation products between adjacent one of the plurality of structural members.

4. The method of claim 3, further comprising:
   securing a plurality of sheathing members over opposing sides of the plurality of structural members, wherein the at least some of the plurality of thermal insulation products are disposed between adjacent one of the plurality of sheathing members.

5. The method of claim 4, wherein the sheathing members comprise at least one selected from drywall, particle board, plywood, siding, and brick.

6. The method of claim 2, wherein the plurality of structural members comprise at least one selected from studs, joists and rafters.

7. The method of claim 2, wherein the plurality of structural members are made of at least one of wood, metal, and composites.

8. The method of claim 1, wherein at least some of the plurality of thermal insulation products comprise portions of composite building products.

9. The method of claim 1, wherein the portion of the liquid is operable to evaporate from adjacent one of the first and second opposing surfaces and condense adjacent the other of the first and second opposing surfaces diurnally.

10. The method of claim 1, wherein the sealed interior portion comprises at least about 2 grams of the liquid per liter of a total volume of the sealed interior portion.

11. The method of claim 1, wherein the sealed interior portion comprises at least about 4 grams of the liquid per liter of a total volume of the sealed interior portion.

12. The method of claim 1, wherein the sealed interior portion comprises at least about 10 grams of the liquid per liter of a total volume of the sealed interior portion.

13. The method of claim 1, wherein at least about 10% of the liquid within the sealed interior portion is operable to evaporate from adjacent one of the first and second opposing surfaces and condense adjacent the other of the first and second opposing surfaces during each cycle.

14. The method of claim 1, wherein at least about 70% of the liquid within the sealed interior portion is operable to evaporate from adjacent one of the first and second opposing surfaces and condense adjacent the other of the first and second opposing surfaces during each cycle.

15. The method of claim 1, wherein at least about 50 g/m$^3$ of the liquid within the sealed interior portion is operable to evaporate from adjacent one of the first and second opposing surfaces and condense adjacent the other of the first and second opposing surfaces during each cycle.

16. The method of claim 1, wherein at least about 100 g/m$^3$ of the liquid within the sealed interior portion is operable to evaporate from adjacent one of the first and second opposing surfaces and condense adjacent the other of the first and second opposing surfaces during each cycle.

17. The method of claim 1, wherein the pressure within the sealed interior portion is not greater than about 500 mbar at a temperature of about 20° C.

18. The method of claim 1, further comprising:
    a gas-permeable enclosure, wherein the support material is disposed within the gas-permeable enclosure.

19. The method of claim 18, wherein the gas-permeable enclosure is disposed between the support material and the gas-impermeable envelope.

20. The method of claim 19, further comprising:
    at least one desiccant disposed between the gas-permeable enclosure and the gas-impermeable envelope.

21. The method of claim 1, wherein the support material comprises a fine powder selected from at least one of silica powder and an aerogel powder.

22. The method of claim 21, wherein the fine powder comprises fumed silica.

23. The method of claim 21, wherein the support material comprises at least about 60 wt % of the fine powder.

24. The method of claim 21, wherein the support material comprises up to about 100 wt % of the fine powder.

25. The method of claim 1, wherein the support material comprises an infrared (IR) opacifier.

26. The method of claim 25, wherein the IR opacifier comprises at least one of titania, aluminum, iron oxide, silicon carbide, and carbon.

27. The method of claim 25, wherein the support material comprises at least about 5 wt % of said IR opacifier.

28. The method of claim 25, wherein the support material comprises not greater than about 25 wt % of the IR opacifier.

29. The method of claim 1, wherein the support material comprises not greater than about 0.1 wt % of fibrous materials.

30. The method of claim 1, wherein the support material comprises at least about 10 wt % of a structural filler.

31. The method of claim 1, wherein the support material comprises not greater than about 70 wt % of a structural filler.

32. The method of claim 30, wherein the structural filler comprises perlite.

33. The method of claim 1, wherein the support material comprises at least about 0.01 wt % of a getter.

34. The method of claim 1, wherein the support material comprises not greater than about 1 wt % of a getter.

35. The method of claim 33, wherein the getter comprises at least one of iron, barium, lithium, and zeolites.

36. The method of claim 1, wherein the support material comprises a total porosity of at least about 80%.

37. The method of claim 1, wherein the support material comprises a total porosity of not greater than about 98%.

38. The method of claim 1, wherein the support material comprises an average pore size of at least about 20 nanometers.

39. The method of claim 1, wherein the support material comprises an average pore size of not greater than about 2000 nanometers.

40. The method of claim 1, wherein the product comprises a density of at least about 80 g/l.

41. The method of claim 1, wherein the product comprises a density of not greater than about 280 g/l.

42. The method of claim 1, wherein the product comprises a thermal resistance of at least about 0.5 $m^2 \cdot K/W$.

43. The method of claim 1, wherein the gas-impermeable envelope comprises a thickness of at least about 25 microns.

44. The method of claim 1, wherein the gas-impermeable envelope comprises a thickness of not greater than about 300 microns.

45. The method of claim 1, wherein the gas-impermeable envelope comprises at least one of a polymeric film and a metallic foil.

46. The method of claim 45, wherein the gas-impermeable envelope comprises an Ethylene Vinyl Alcohol (EVOH) barrier film.

47. The method of claim 46, wherein the gas-impermeable envelope comprises a coextruded polyethylene (PE)/EVOH barrier film.

48. The method of claim 46, wherein the gas-impermeable envelope comprises a metalized EVOH barrier film.

49. The method of claim 1, wherein the liquid comprises water.

50. The method of claim 1, wherein the product comprises a substantially planar product having spaced apart first and second sidewalls.

51. The method of claim 50, wherein a distance between the first and second sidewalls is at least about 2 mm.

52. The method of claim 51, wherein the distance between the first and second sidewalls is at least about 20 mm.

53. The method of claim 51, wherein a distance between the first and second sidewalls is not greater than about 100 mm.

54. The method of claim 53, wherein the distance between the first and second sidewalls is not greater than about 50 mm.

\* \* \* \* \*